United States Patent
Khlat et al.

(10) Patent No.: US 9,735,854 B2
(45) Date of Patent: Aug. 15, 2017

(54) SYSTEMS FOR ANTENNA SWAPPING SWITCHING AND METHODS OF OPERATION THEREOF

(71) Applicant: RF Micro Devices, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 15/130,380

(22) Filed: Apr. 15, 2016

(65) Prior Publication Data

US 2017/0207846 A1 Jul. 20, 2017

Related U.S. Application Data

(60) Provisional application No. 62/279,895, filed on Jan. 18, 2016.

(51) Int. Cl.
*H04B 1/44* (2006.01)
*H04B 7/08* (2006.01)
(Continued)

(52) U.S. Cl.
CPC ......... *H04B 7/0868* (2013.01); *H04B 1/0057* (2013.01); *H04B 1/3827* (2013.01)

(58) Field of Classification Search
CPC .... H04B 1/0458; H04B 7/0602; H04B 7/026; H04B 7/0608; H04B 1/44; H04B 5/02;
(Continued)

(56) References Cited

U.S. PATENT DOCUMENTS

| 4,641,365 A | * | 2/1987 | Montini, Jr. | ............. H04B 1/48 455/217 |
| 4,853,972 A | * | 8/1989 | Ueda | ......................... H04B 1/44 455/254 |

(Continued)

OTHER PUBLICATIONS

Ex Parte Quayle Action for U.S. Appl. No. 15/364,358, dated Apr. 4, 2017, 7 pages.

(Continued)

*Primary Examiner* — Edward Urban
*Assistant Examiner* — Max Mathew
(74) *Attorney, Agent, or Firm* — Withrow & Terranova, P.L.L.C.

(57) ABSTRACT

The present disclosure relates to antenna swapping for a wireless, e.g., cellular, radio system. In particular, embodiments of a single-die antenna swapping switching circuit are disclosed. In some embodiments, the single-die antenna swapping switching circuit enables antenna swapping in a wireless device using only two coaxial cables or transmission line connections regardless of an order of an antenna multiplexer of the wireless device. This results in significant space savings, particularly as the order of the antenna multiplexer increases, compared to antenna swapping techniques that require a pair of coaxial cables or transmission lines for each order of the antenna multiplexer. In addition, the single-die antenna swapping switching circuit is designed to be located between a radio front-end system and the antenna multiplexer such that intermodulation distortion and harmonics resulting from the switches comprised in the single-die antenna swapping switching circuit are mitigated.

17 Claims, 16 Drawing Sheets

(51) Int. Cl.
*H04B 1/00* (2006.01)
*H04B 1/3827* (2015.01)

(58) Field of Classification Search
CPC .......... H04B 1/525; H04B 1/48; H04B 1/006;
H04B 15/02; H04B 1/1009; H04B
1/1615; H04B 7/082; H03H 7/40; H04W
88/02; H03K 17/693; H03K 17/102;
H03K 17/687; H03K 17/063; H03K
17/122; H03K 17/145; H03K 3/012
USPC .......... 455/78, 82, 83, 19, 25, 129; 343/722,
343/745, 750, 770, 852, 334, 747, 751
See application file for complete search history.

(56) References Cited

U.S. PATENT DOCUMENTS

| | | | | | |
|---|---|---|---|---|---|
| 4,980,660 | A * | 12/1990 | Nakamura | ................ | H01P 1/10 333/101 |
| 5,774,792 | A * | 6/1998 | Tanaka | ................ | H03K 17/693 333/103 |
| 5,784,687 | A * | 7/1998 | Itoh | .......... | H04B 1/48 333/103 |
| 5,812,939 | A * | 9/1998 | Kohama | .............. | H04B 1/48 327/408 |
| 5,815,803 | A * | 9/1998 | Ho | ................ | H04B 1/525 333/1.1 |
| 5,815,804 | A * | 9/1998 | Newell | ................ | H04B 1/005 330/101 |
| 5,991,607 | A * | 11/1999 | Burdenski | ................ | H04B 1/48 333/103 |
| 6,002,920 | A * | 12/1999 | Consolazio | ............ | H04B 1/005 333/101 |
| 6,118,985 | A * | 9/2000 | Kawakyu | ............. | H03K 17/063 333/103 |
| 6,122,488 | A * | 9/2000 | Leizerovich | ............ | H04B 1/48 330/251 |
| 6,721,544 | B1 * | 4/2004 | Franca-Neto | ............ | H04B 1/52 333/172 |
| 7,155,267 | B2 * | 12/2006 | Lee | ........ | H04B 1/005 343/751 |
| 7,702,278 | B2 * | 4/2010 | Onomatsu | ............ | H04B 7/0814 343/751 |
| 8,351,849 | B2 * | 1/2013 | Ying | ................ | H04B 1/406 343/729 |
| 8,560,028 | B1 * | 10/2013 | Mulbrook | ................ | H01Q 1/28 343/702 |
| 8,594,584 | B2 * | 11/2013 | Greene | ................ | H04B 1/0458 333/17.3 |
| 8,781,522 | B2 * | 7/2014 | Tran | ........ | H01Q 1/22 343/745 |
| 2003/0232602 | A1 * | 12/2003 | Akiya | ................ | H04B 1/44 455/78 |
| 2004/0033787 | A1 * | 2/2004 | Weber | ................ | H04B 7/04 455/78 |
| 2005/0014472 | A1 * | 1/2005 | Cox | ........ | H04B 1/48 455/82 |
| 2014/0105079 | A1 * | 4/2014 | Bengtsson | ............ | H04B 1/005 370/297 |
| 2014/0376417 | A1 * | 12/2014 | Khlat | ............ | H04B 1/0064 370/277 |
| 2015/0017929 | A1 | 1/2015 | Ljung et al. | | |
| 2016/0134016 | A1 * | 5/2016 | Hsu | ........ | H01Q 1/243 343/853 |

OTHER PUBLICATIONS

Notice of Allowance for U.S. Appl. No. 15/364,358, dated Jun. 8, 2017, 9 pages.

* cited by examiner

SYSTEMS FOR ANTENNA SWAPPING SWITCHING AND METHODS OF OPERATION THEREOF

RELATED APPLICATIONS

This application claims the benefit of provisional patent application Ser. No. 62/279,895, filed Jan. 18, 2016, the disclosure of which is hereby incorporated herein by reference in its entirety.

FIELD OF THE DISCLOSURE

The present disclosure relates to antenna swapping in a wireless device.

BACKGROUND

Particularly in light of Carrier Aggregation (CA) schemes supported by modern cellular communications networks, wireless devices, such as mobile phones, typically support multiple frequency bands. Support for multiple frequency bands is provided by multiple radio front-ends, each supporting one or more frequency bands. The radio front-ends are connected to a common antenna via a multiplexer (e.g., a diplexer for the dual-band scenario or a triplexer for a tri-band scenario). In addition, in order to support Multiple-Input-Multiple-Output (MIMO) operation, wireless devices may also include an additional antenna(s) along with a corresponding multiplexer(s) and radio front-end(s).

SUMMARY

The present disclosure relates to antenna swapping for a wireless, e.g., cellular, radio system. In particular, embodiments of a single-die antenna swapping switching circuit are disclosed. In some embodiments, the single-die antenna swapping switching circuit includes a number (N) of first input/output ports and a number (M) of second input/output ports, where N and M are each greater than or equal to 2. The single-die antenna swapping switching circuit further includes a first antenna swapping port and a second antenna swapping port. Still further, the single-die antenna swapping switching circuit includes a number (N) of first switches having first terminals coupled to the first input/output ports, respectively, and second terminals coupled to the second input/output ports; a number (N) of second switches having first terminals coupled to the first input/output ports, respectively, and second terminals coupled to the first antenna swapping port; and a number (M) of third switches having first terminals coupled to the second input/output ports, respectively, and second terminals coupled to the second antenna swapping port. The single-die antenna swapping switching circuit enables antenna swapping in a wireless device using only two coaxial cable or transmission line connections regardless of an order of an antenna multiplexer of the wireless device. This results in significant space savings, particularly as the order of the antenna multiplexer increases, compared to antenna swapping techniques that require a pair of coaxial cables or transmission lines for each order of the antenna multiplexer. In addition, the single-die antenna swapping switching circuit is designed to be located between a radio front-end system and the antenna multiplexer such that intermodulation distortion and harmonics resulting from the switches comprised in the single-die antenna swapping switching circuit are mitigated.

In some embodiments, N is equal to M, and the second terminals of the first switches are coupled to the second input/output ports, respectively. In other embodiments, N is greater than M, and the second terminals of at least two of the first switches are coupled to a same one of the second input/output ports.

In some embodiments, N is greater than or equal to 3, and M is greater than or equal to 3.

In some embodiments, at least one switch of the first switches, the second switches, and the third switches is a series-shunt-series switch.

In some embodiments, the first input/output ports are adapted to be coupled to input/output ports of a multi-band radio front-end system; the second input/output ports are adapted to be coupled to a first antenna via a multiplexer; the second antenna swapping port is adapted to be coupled, via a first transmission line or first coaxial cable, to a first antenna swapping port of second single-die antenna swapping circuitry associated with a second antenna; and the first antenna swapping port is adapted to be coupled, via a second transmission line or second coaxial cable, to a second antenna swapping port of the second single-die antenna swapping circuitry associated with the second antenna.

In some embodiments, the first switches, the second switches, and the third switches are adapted to be controlled to provide a transmit signal received at one of the first input/output ports to the first antenna swapping port but not to any of the second input/output ports when antenna swapping is desired. Further, in some embodiments, the first switches, the second switches, and the third switches are further adapted to be controlled to provide a transmit signal received at one of the first input/output ports to one of the second input/output ports but not the first antenna swapping port when antenna swapping is not desired.

Embodiments of a radio system (e.g., for a wireless device) are also disclosed. In some embodiments, the radio system includes a first radio front-end subsystem including a number (N) of input/output ports, where N is greater than or equal to 2. The radio system further includes first single-die antenna swapping switching circuitry including a number (N) of first input/output ports coupled to the input/output ports of the first radio front-end subsystem, respectively; a number (M) of second input/output ports, where M is greater than or equal to 2; a first antenna swapping port; and a second antenna swapping port. The first single-die antenna swapping switching circuitry further includes a number (N) of first switches having first terminals coupled to the first input/output ports of the first single-die antenna swapping switching circuitry, respectively, and second terminals coupled to the second input/output ports of the first single-die antenna swapping switching circuitry; a number (N) of second switches having first terminals coupled to the first input/output ports of the first single-die antenna swapping switching circuitry, respectively, and second terminals coupled to the first antenna swapping port of the first single-die antenna swapping switching circuitry; and a number (M) of third switches having first terminals coupled to the second input/output ports of the first single-die antenna swapping switching circuitry, respectively, and second terminals coupled to the second antenna swapping port of the first single-die antenna swapping switching circuitry. The radio system further includes a first multiplexer including a number (M) of first input/output ports coupled to the second input/output ports of the first single-die antenna swapping switching circuitry, respectively; and a second input/output port. The radio system further includes a first antenna coupled to the second input/output port of the first multiplexer.

In some embodiments, the radio system further includes a second radio front-end subsystem and second single-die antenna swapping switching circuitry. The second single-die antenna swapping switching circuitry includes first input/output ports coupled to input/output ports of the second radio front-end subsystem, respectively; second input/output ports; a first antenna swapping port coupled to the second antenna swapping port of the first single-die antenna swapping switching circuitry; and a second antenna swapping port coupled to the first antenna swapping port of the first single-die antenna swapping switching circuitry. The radio system further includes a second multiplexer including input/output ports coupled to the second input/output ports of the second single-die antenna swapping switching circuitry, respectively, and a second input/output port. The radio system further includes a second antenna coupled to the second input/output port of the second multiplexer.

In some embodiments, the second single-die antenna swapping switching circuitry further includes first switches having first terminals coupled to the first input/output ports of the second single-die antenna swapping switching circuitry, respectively, and second terminals coupled to the second input/output ports of the second single-die antenna swapping switching circuitry; second switches having first terminals coupled to the first input/output ports of the second single-die antenna swapping switching circuitry, respectively, and second terminals coupled to the first antenna swapping port of the second single-die antenna swapping switching circuitry; and third switches having first terminals coupled to the second input/output ports of the second single-die antenna swapping switching circuitry, respectively, and second terminals coupled to the second antenna swapping port of the second single-die antenna swapping switching circuitry.

In some embodiments, N is equal to M, and the second terminals of the first switches of the first single-die antenna swapping switching circuitry are coupled to the second input/output ports of the first single-die antenna swapping switching circuitry, respectively. In other embodiments, N is greater than M, and the second terminals of at least two of the first switches of the first single-die antenna swapping switching circuitry are coupled to a same one of the second input/output ports of the first single-die antenna swapping switching circuitry.

In some embodiments, N is greater than or equal to 3, and M is greater than or equal to 3.

In some embodiments, at least one switch of the first switches, the second switches, and the third switches of the first single-die antenna swapping switching circuitry is a series-shunt-series switch.

In some embodiments, the first switches, the second switches, and the third switches of the first single-die antenna swapping switching circuitry are adapted to be controlled to provide a transmit signal received at one of the first input/output ports of the first single-die antenna swapping switching circuitry to the first antenna swapping port but not to any of the second input/output ports when antenna swapping is desired. Further, in some embodiments, the first switches, the second switches, and the third switches of the first single-die antenna swapping switching circuitry are further adapted to be controlled to provide a transmit signal received at one of the first input/output ports of the first single-die antenna swapping switching circuitry to one of the second input/output ports of the first single-die antenna swapping switching circuitry but not the first antenna swapping port of the first single-die antenna swapping switching circuitry when antenna swapping is not desired.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 5:
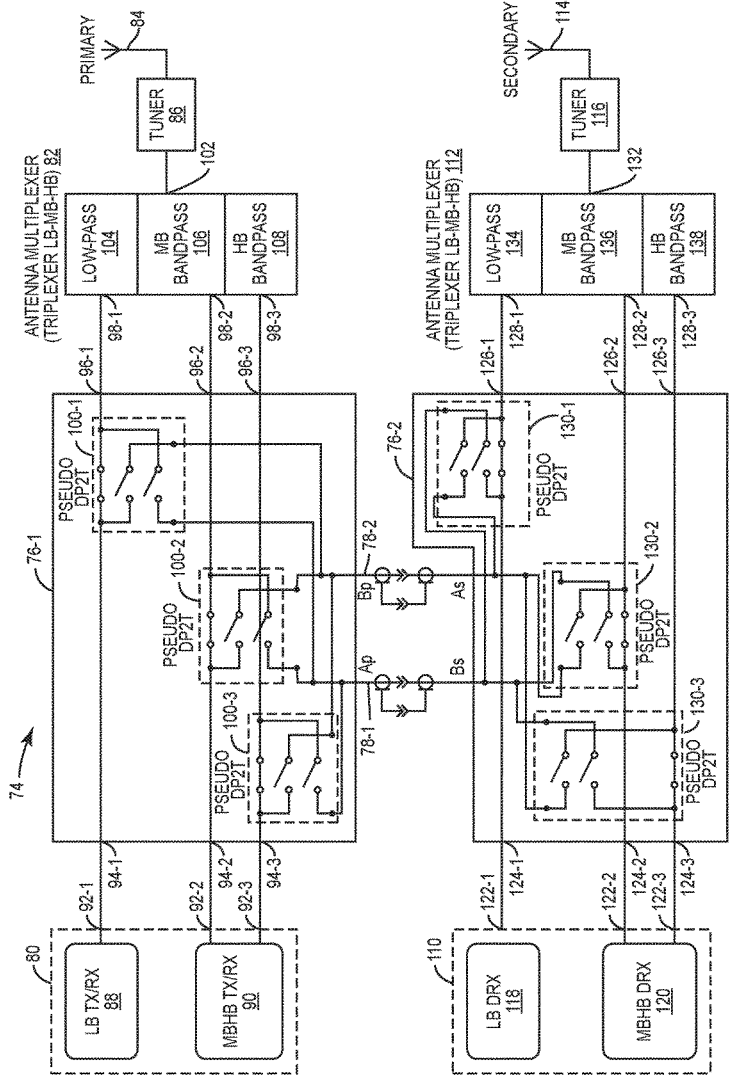
FIG. 5 illustrates a radio system incorporating single-die antenna swapping circuitry according to some embodiments of the present disclosure.
Figure 15:
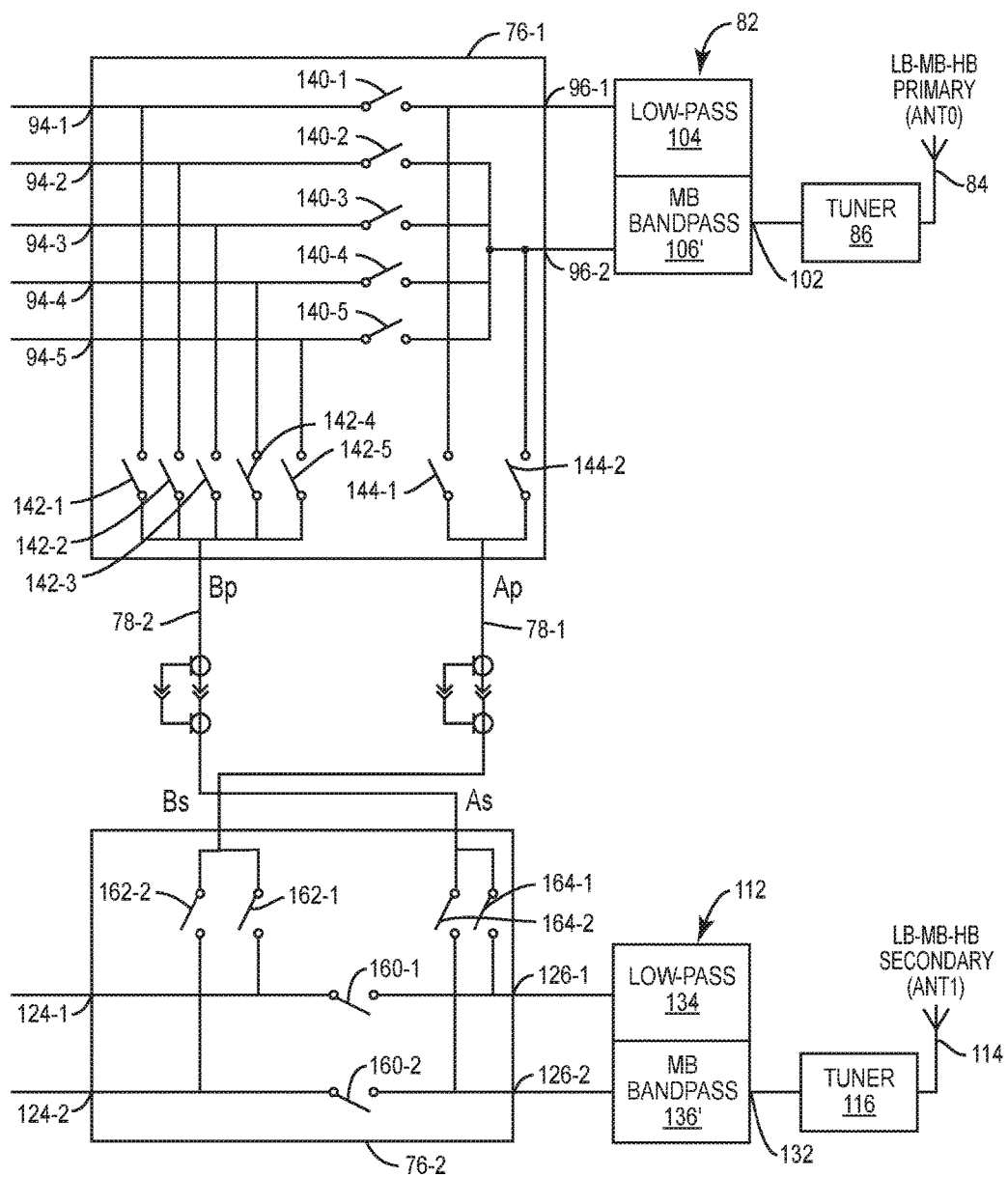
Figure 16:
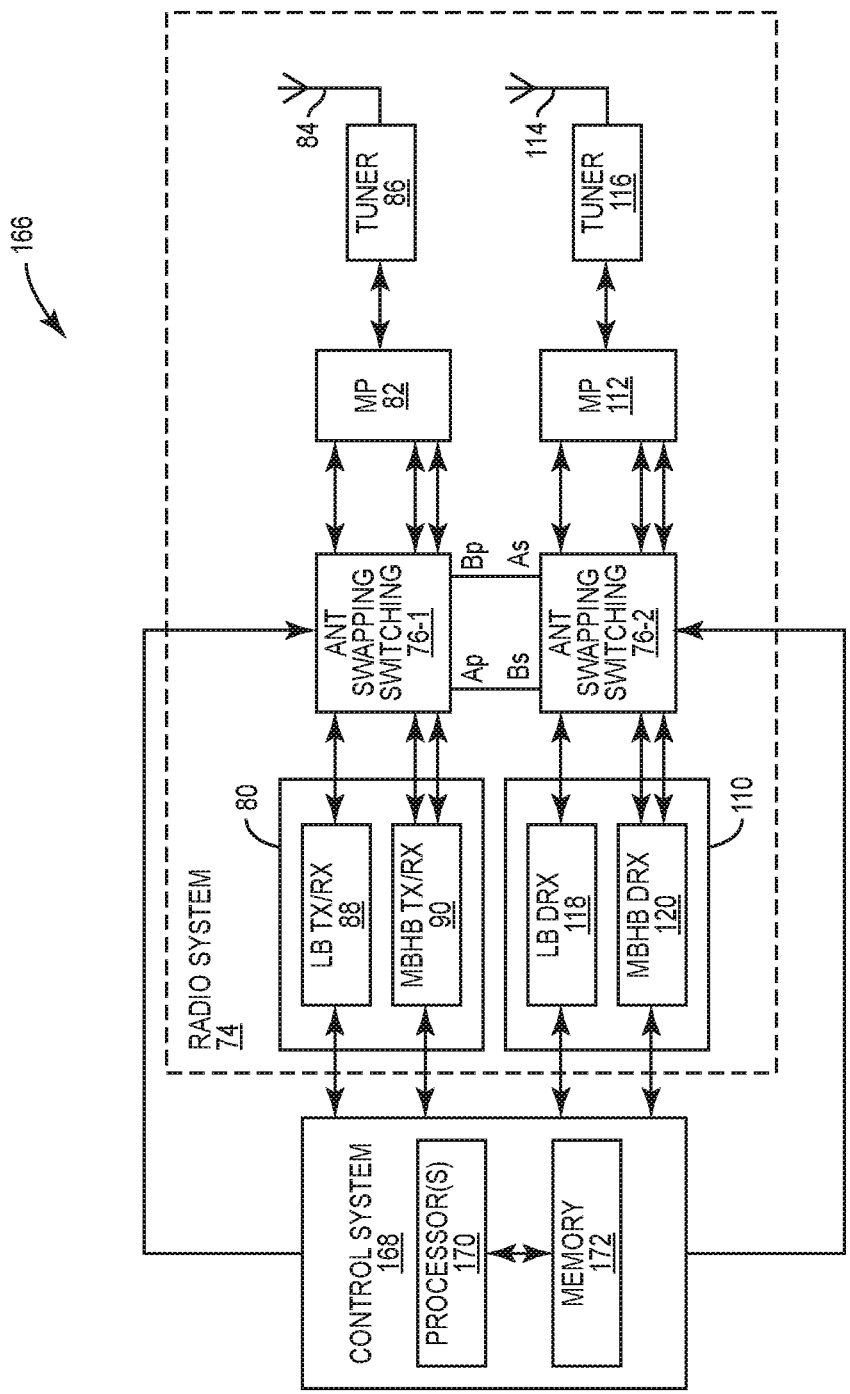

FIG. 15 illustrates another example of the antenna swapping switching circuitry for the primary path and the antenna swapping switching circuitry for the secondary path of the radio system of FIG. 5 in which the antenna swapping circuitry for the primary path is a 5×2 switching circuit and the antenna swapping switching circuitry for the secondary path is a 2×2 switching circuit; and FIG. 16 illustrates one example of a system (e.g., a wireless device such as, e.g., a mobile phone) that includes the radio system of FIG. 5 according to some embodiments of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It should also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be understood that, although the terms "upper," "lower," "bottom," "intermediate," "middle," "top," and the like may be used herein to describe various elements, these elements should not be limited by these terms. These terms are only used to distinguish one element from another. For example, a first element could be termed an "upper" element and, similarly, a second element could be termed an "upper" element depending on the relative orientations of these elements, without departing from the scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

Particularly in light of Carrier Aggregation (CA) schemes supported by modern cellular communications networks, wireless devices, such as mobile phones, typically support multiple frequency bands. Support for multiple frequency bands is provided by multiple radio front-ends, each supporting one or more frequency bands. The radio front-ends are connected to a common antenna via a multiplexer (e.g., a diplexer for the dual-band scenario or a triplexer for a tri-band scenario). In addition, in order to support Multiple-Input-Multiple-Output (MIMO) operation, wireless devices may also include an additional antenna(s) along with a corresponding multiplexer(s) and radio front-end(s).

Figure 1:
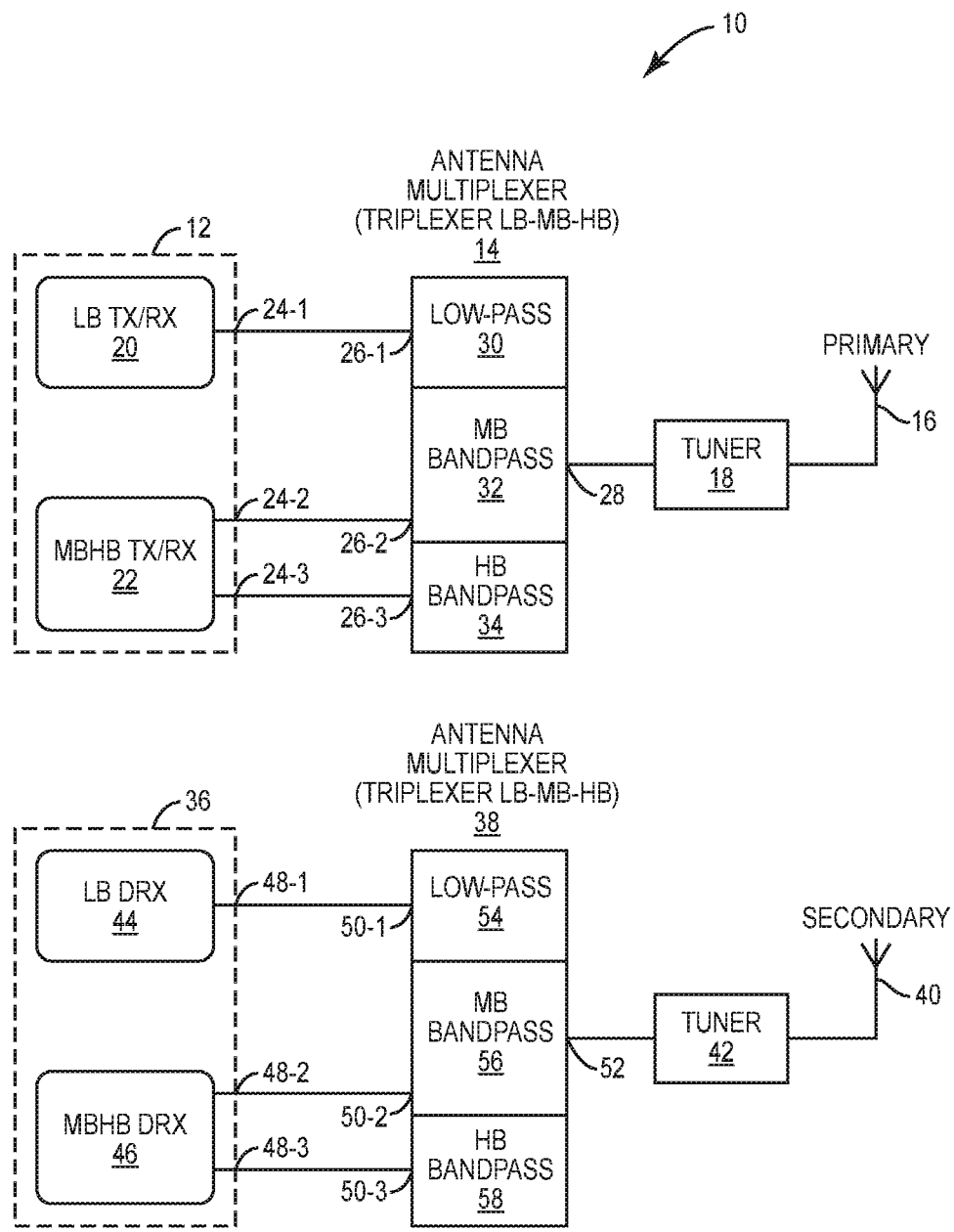
FIGS. 1 and 2 illustrate examples of a radio system.

As an example, FIG. 1 illustrates a radio system 10, which may be implemented in a wireless device. The radio system 10 includes a first, or primary, radio front-end subsystem 12, an antenna multiplexer 14 (referred to herein as a multiplexer 14), and an antenna 16, which is coupled to the multiplexer 14 via a tuner 18 in this example. The first radio front-end subsystem 12 includes a Low-Band (LB) transceiver 20 and a Middle-Band-High-Band (MBHB) transceiver 22. The LB transceiver 20 is coupled to a first Input/Output (I/O) port 24-1 of the first radio front-end subsystem 12 to thereby transmit and receive signals in the LB (e.g., signals in the range of 450 megahertz (MHz) to 960 MHz) via the first I/O port 24-1. The MBHB transceiver 22 is coupled to a second I/O port 24-2 and a third I/O port 24-3 of the first radio front-end subsystem 12. The MBHB transceiver 22 transmits and receives signals in a Middle-Band (MB) (e.g., signals in the range of 1710 MHz to 2200 MHz) via the second I/O port 24-2 and transmits and receives signals in a High-Band (HB) (e.g., signals in the range of 2300 MHz to 2700 MHz) via the third I/O port 24-3. The multiplexer 14 includes a first I/O port 26-1, a second I/O port 26-2, and a third I/O port 26-3 that are coupled to the I/O ports 24-1, 24-2, and 24-3 of the first radio front-end subsystem 12, respectively. The first I/O port 26-1 is coupled to an I/O port 28 of the multiplexer 14 via a low-pass filter 30 corresponding to the LB, the second I/O port 26-2 is coupled to the I/O port 28 of the multiplexer 14 via a MB bandpass filter 32, and the third I/O port 26-3 is coupled to the I/O port 28 of the multiplexer 14 via a HB bandpass filter 34. The I/O port 28 of the multiplexer 14 is coupled to the antenna 16 via, in this example, the tuner 18.

In a similar manner, the radio system 10 includes a second, or secondary, radio front-end subsystem 36, a second antenna multiplexer 38 (referred to herein as a multiplexer 38), and a second antenna 40, which is coupled to the second multiplexer 38 via a tuner 42 in this example. The second radio front-end subsystem 36 includes a LB Discontinuous Receiver (DRX) 44 (e.g., for receive, or downlink, MIMO operation in the LB) and a MBHB DRX 46 (e.g., for receive, or downlink, MIMO operation in the MB and/or HB). The LB DRX 44 is coupled to a first I/O port 48-1 of the second radio front-end subsystem 36 to thereby receive signals in the LB (e.g., signals in the range of 450 MHz to 960 MHz) via the first I/O port 48-1. The MBHB DRX 46 is coupled to a second I/O port 48-2 and a third I/O port 48-3 of the second radio front-end subsystem 36. The MBHB DRX 46 receives signals in a MB (e.g., signals in the range of 1710 MHz to 2200 MHz) via the second I/O port 48-2 and receives signals in a HB (e.g., signals in the range of 2300 MHz to 2700 MHz) via the third I/O port 48-3. The second multiplexer 38 includes a first I/O port 50-1, a second I/O port 50-2, and a third I/O port 50-3 that are coupled to the I/O ports 48-1, 48-2, and 48-3 of the second radio front-end subsystem 36, respectively. The first I/O port 50-1 is coupled to an I/O port 52 of the second multiplexer 38 via a low-pass filter 54 corresponding to the LB, the second I/O port 50-2 is coupled to the I/O port 52 of the second multiplexer 38 via a MB bandpass filter 56, and the third I/O port 50-3 is coupled to the I/O port 52 of the second multiplexer 38 via a HB bandpass filter 58. The I/O port 52 of the second multiplexer 38 is coupled to the second antenna 40 via, in this example, the tuner 42.

Figure 2:
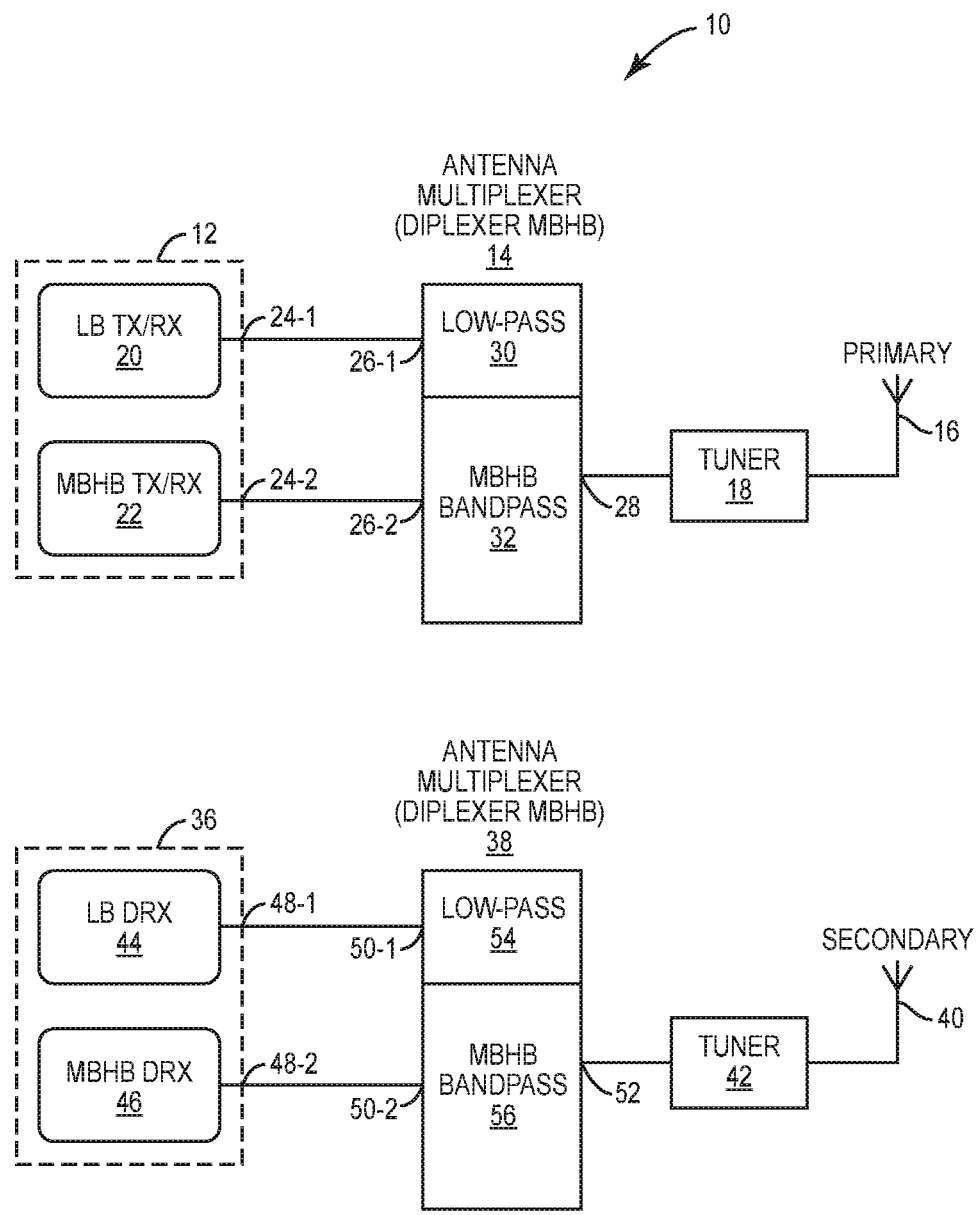

FIG. 2 illustrates another example of the radio system 10 in which the multiplexers 14 and 38 are diplexers and the MB and HB and treated as a single band, referred to as the MBHB frequency band (e.g., 1710 MHz to 2700 MHz). Otherwise, the radio system 10 is the same as that described with respect to FIG. 1 above.

In wireless devices incorporating a radio system, such as the radio system 10 of FIG. 1 or FIG. 2, there is a need for antenna swapping, especially when an antenna transmit efficiency is degraded when a user or an object is close to an antenna, thus reducing the transmit power of the wireless device. For example, if the wireless device is a mobile phone, the user's hand or other object close to the primary antenna 16 reduces the transmit power for signals transmitted from the mobile phone to the cellular base station, which in turn increases the possibility of a dropped call, especially if the mobile phone is near the cell edge (i.e., near the edge of the cellular range). Antenna swapping can be used to improve performance in such a scenario by transmitting via the secondary antenna 40, which may have a better radiated efficiency than the primary antenna 16 (e.g., the user's hand may be covering the primary antenna 16 but not the secondary antenna 40).

Figure 3:
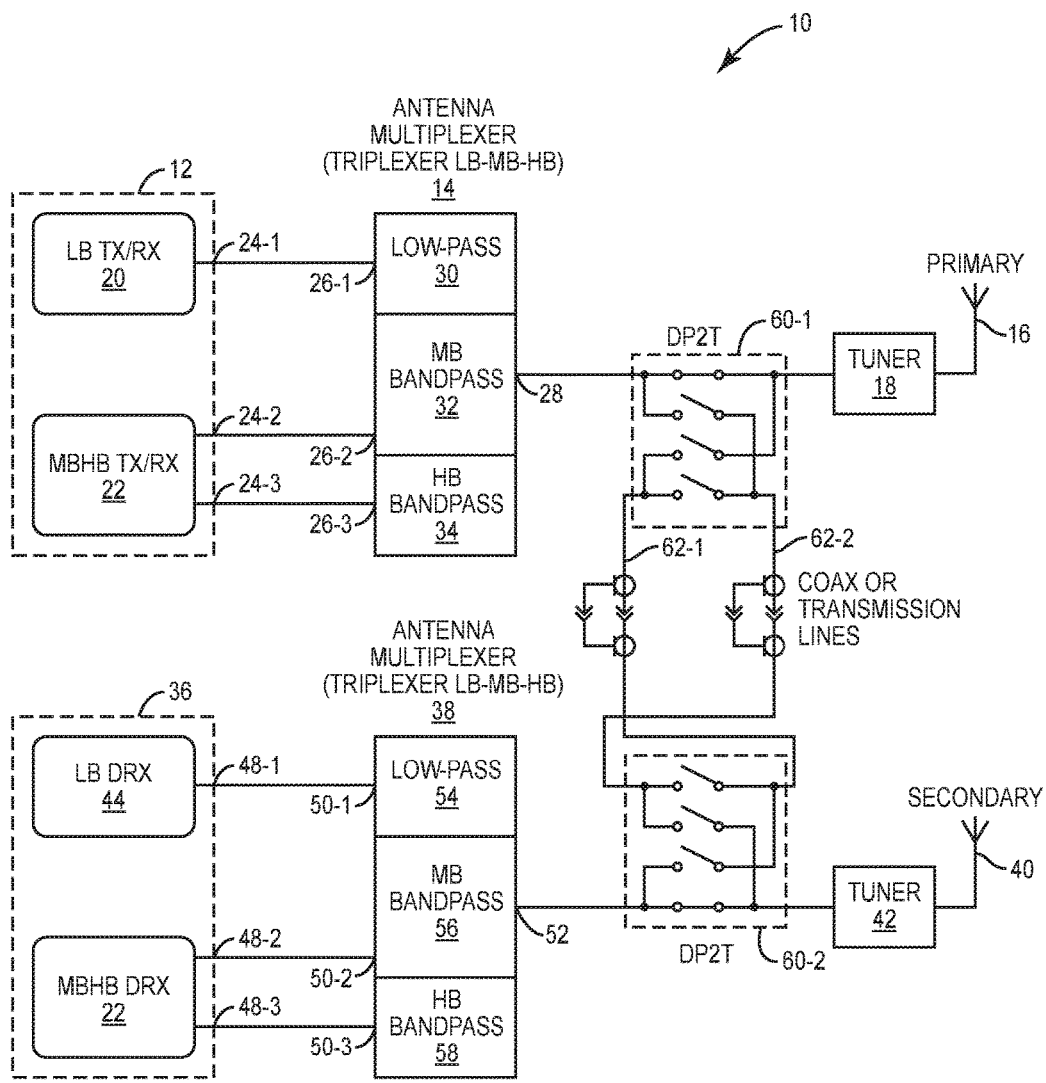
FIG. 3 illustrates one antenna swapping solution for a radio system.

One antenna swapping solution is to add antenna swapping switching circuitry 60-1 and 60-2 between the antenna multiplexers 14 and 38 and the antennas 16 and 40, respectively, as shown in FIG. 3. The antenna swapping switching circuitry 60-1 is coupled to the antenna swapping switching circuitry 60-2 by transmission lines or coaxial cables 62-1 and 62-2, as shown. The antenna swapping solution of FIG. 3 has an advantage in that it uses only two coaxial cables, or transmission lines, to connect to perform the swapping and connection to the two antennas 16 and 40 that are physically separated (e.g., located at opposite sides of the wireless device for correlation in Receive (RX) MIMO and for reduced coupling. The major issue of this antenna swapping solution is that for Downlink (DL) CA and for Uplink (UL) CA, the switching elements within the antenna swapping switching circuitry 60-1 and 60-2 are not linear and create harmonics and intermodulation products that fall in some other CA receive bands and are not filtered or fall into Industrial, Scientific, and Medical (ISM) and/or Global Positioning System (GPS) bands, thereby desensing the receivers for some CA combinations. Some examples of these CA cases are CA B12-134, CA B8-1313, CA B1-B3 for UL CA, and CA B25-B4 for UL CA. Addressing this issue requires having switching elements (Double-Pole Dual-Throw (DP2T) switches) with a third-order intercept point as high as +85 decibel-milliwatts (dBm) under a Voltage Standing Wave Ratio (VSWR) of 6:1, which is not feasible in today's technology with reasonable size and current.

Figure 4:
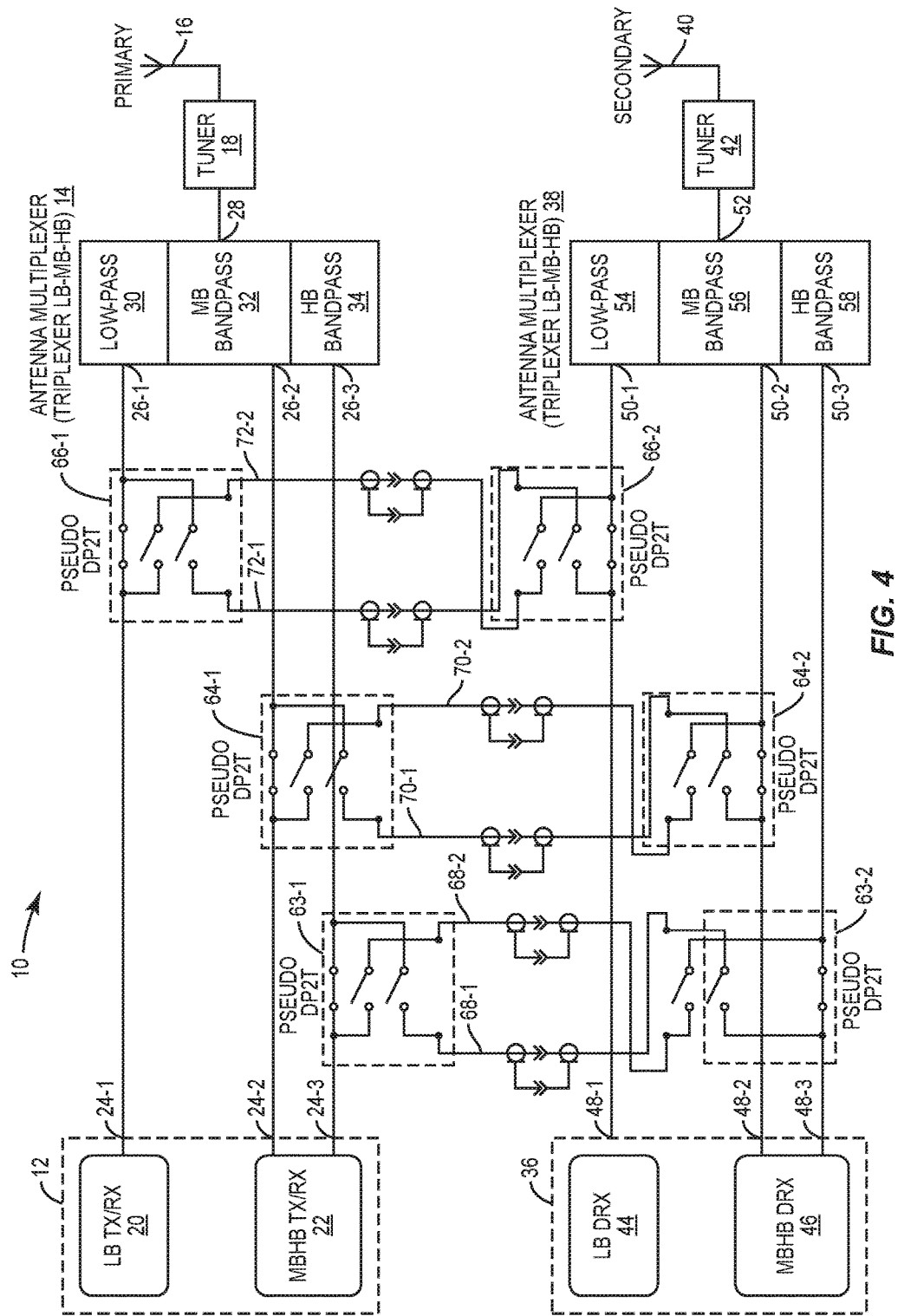
FIG. 4 illustrates another antenna swapping solution for a radio system.

To overcome these non-linearity issues, another antenna swapping solution is to have multiple DP2T switching elements 63-1 through 66-2, such as pseudo-DP2T switching elements, before the antenna multiplexers 14 and 38 as illustrated in FIG. 4. This solution requires, for each pseudo-DP2T switch, two corresponding coaxial cables to connect to the corresponding pseudo-DP2T for the other antenna. More specifically, in the example of FIG. 4, the pseudo-DP2T switch 63-1 for the HB in the primary path is coupled to the pseudo-DP2T switch 63-2 for the HB in the secondary path by coaxial cables 68-1 and 68-2; the pseudo-DP2T switch 64-1 for the MB in the primary path is coupled to the pseudo-DP2T switch 64-2 for the MB in the secondary path by coaxial cables 70-1 and 70-2; and the pseudo-DP2T switch 66-1 for the LB in the primary path is coupled to the pseudo-DP2T switch 66-2 for the LB in the secondary path by coaxial cables 72-1 and 72-2.

The antenna swapping solution of FIG. 4 addresses the non-linearity concern for UL CA intermodulation products and DL CA harmonics. This is because, for example, the generated harmonics on the LB path by the switching elements in the pseudo-DP2T switches 63-1 and 63-2 is filtered by the multiplexers 14 and 38 and, for example, in the UL CA LB-MB, the switches do not see both transmitter signals but see only one transmit signal. However, the antenna swapping solution of FIG. 4 requires extra coaxial cables, resulting in an increase in volume to add these coaxial cables. This makes the antenna swapping solution of FIG. 4 unattractive, especially if a triplexer is used. The number of coaxial cables that are required by the antenna swapping solution of FIG. 4 increases as the order of the antenna's multiplexers 14 and 38 increases.

As such, there is a need for an antenna swapping solution that addresses both of the issues described above with respect to the antenna swapping solutions of FIGS. 3 and 4. In particular, there is a need for an antenna swapping solution that addresses concerns relating to the non-linearity of the switches used for antenna swapping and also minimizes the number of required coaxial cables or transmission lines. The present disclosure relates to an antenna swapping switching solution that allows operation with multiple types of antenna multiplexer interfaces using only two coaxial cables or transmission lines instead of six or more coaxial cables or transmission lines, thus enabling volume and connector savings in a terminal, while also mitigating inter-modulation products and harmonics due to the non-linearity of the switches used for antenna swapping.

In some embodiments, an antenna swapping solution is provided that uses only two coaxial cables or transmission lines for antenna swapping and still achieves the benefits of harmonics and linearity requirement reduction. More specifically, the antenna swapping solution uses a single switching element component (referred to herein as antenna swapping switching circuitry or an antenna swapping switching element) that has two single output ports (Ap and Bp) (which are also referred to herein as antenna swapping ports) to connect to the two coaxial cables, as shown in FIG. 5. The single switching element is made on a single die. For example, the single switching element may be made of, or implemented on, a single Silicon-On-Insulator (SOI) die, Silicon-On-Sapphire (SOS) die, or a Microelectromechanical System (MEMS).

One example of a (cellular) radio system 74 implementing the single switching element for antenna swapping is illustrated in FIG. 5. The radio system 74 is similar to the radio system 10 of FIG. 4 but where the pseudo-DP2T switches 63-1, 64-1, and 66-1 in the primary path are replaced by single-die antenna swapping switching circuitry 76-1 having antenna swapping ports (Ap and Bp) and the pseudo-DP2T switches 63-2, 64-2, and 66-2 in the secondary path are replaced by single-die antenna swapping switching circuitry 76-2 having antenna swapping ports (As and Bs). The single-die antenna swapping switching circuitry 76-1 and 76-2 is such that only two coaxial cables 78-1 and 78-2 are used to couple the antenna swapping ports of the single-die antenna swapping switching circuitry 76-1 and 76-2, regardless of the multiplexer order. In this manner, space savings is achieved. Further, the single-die antenna swapping switching circuitry 76-1 and 76-2 are located between the multiplexers and the radio front-ends and, as such, intermodulation distortion and harmonics due to the non-linear of the switches of the single-die antenna swapping switching circuitry 76-1 and 76-2 are mitigated by the multiplexers.

More specifically, as illustrated in FIG. 5, the radio system 74, which may be implemented in a wireless device such as a mobile phone, includes a primary (or first) radio front-end subsystem 80, the single-die antenna swapping switching circuitry 76-1, a primary antenna multiplexer 82 (referred to herein as a primary multiplexer 82), and a primary antenna 84, which is coupled to the primary multiplexer 82 via a primary tuner 86 in this example. In this example, the primary radio front-end subsystem 80 includes a LB transceiver 88 and a MBHB transceiver 90. The LB transceiver 88 is coupled to a first I/O port 92-1 of the primary radio front-end subsystem 80 to thereby transmit and receive signals in the LB (e.g., signals in the range of 450 MHz to 960 MHz) via the first I/O port 92-1. The MBHB transceiver 90 is coupled to a second I/O port 92-2 and a third I/O port 92-3 of the primary radio front-end subsystem 80. The MBHB transceiver 90 transmits and receives signals in a MB (e.g., signals in the range of 1710 MHz to 2200 MHz) via the second I/O port 92-2 and transmits and receives signals in a HB (e.g., signals in the range of 2300 MHz to 2700 MHz) via the third I/O port 92-3.

The single-die antenna swapping switching circuitry 76-1 includes a first set of I/O ports 94-1 through 94-3 that are coupled to the I/O ports 92-1 through 92-3 of the primary radio front-end subsystem 80, respectively. Note that, as used herein, "respectively" means "one-to-one" but does not necessarily imply any specific ordering. Thus, with respect to the first set of I/O ports 94-1 through 94-3, the first set of I/O ports 94-1 through 94-3 are coupled to the I/O ports 92-1 through 92-3 of the primary radio front-end subsystem 80, respectively, in that there is a one-to-one coupling of the I/O ports 94-1 through 94-3 to the I/O ports 92-1 through 92-3 of the primary radio front-end subsystem 80. However, even though the first I/O port 94-1 is shown as being coupled to the first I/O port 92-1 of the primary radio front-end subsystem 80, the second I/O port 94-2 is shown as being coupled to the second I/O port 92-2 of the primary radio front-end subsystem 80, and so on, the present disclosure is not limited thereto. For example, the first I/O port 94-1 may alternatively be coupled to the second I/O port 92-2 of the primary radio front-end subsystem 80, the second I/O port 94-2 may alternatively be coupled to the third I/O port 92-3 of the primary radio front-end subsystem 80, and the third I/O port 94-3 may alternatively be coupled to the first I/O port 92-1 of the primary radio front-end subsystem 80.

The single-die antenna swapping switching circuitry 76-1 also includes a second set of I/O ports 96-1 through 96-3 that are coupled to I/O ports 98-1 through 98-3 of the primary multiplexer 82, respectively. The antenna swapping port Ap of the single-die antenna swapping switching circuitry 76-1 is coupled to the antenna swapping port Bs of the single-die antenna swapping switching circuitry 76-2 via the coaxial cable 78-1 or transmission line. The antenna swapping port Bp of the single-die antenna swapping switching circuitry 76-1 is coupled to the antenna swapping port As of the single-die antenna swapping switching circuitry 76-2 via the coaxial cable 78-2 or transmission line. The single-die antenna swapping switching circuitry 76-1 includes, in this example, a number of pseudo-DP2T switching elements 100-1 through 100-3 that operate to selectively couple the first set of I/O ports 94-1 through 94-3 to either the second set of I/O ports 96-1 through 96-3 or one of the antenna swapping ports Ap and Bp. For example, if antenna swapping is desired for LB transmission, the pseudo-DP2T switching element 100-1 is controlled (e.g., via an internal or external controller) such that the I/O port 94-1 is coupled to the antenna swapping port Bp but not the I/O port 96-1.

Conversely, if antenna swapping is not desired for LB transmission, the pseudo-DP2T switching element 100-1 is controlled (e.g., via an internal or external controller) such that the I/O port 94-1 is coupled to the I/O port 96-1, but not the antenna swapping port Bp.

The primary multiplexer 82 includes the I/O ports 98-1 through 98-3 that are coupled to the second set of I/O ports 96-1 through 96-3 of the single-die antenna swapping switching circuitry 76-1, respectively. The first I/O port 98-1 is coupled to an I/O port 102 of the primary multiplexer 82 via a low-pass filter 104 corresponding to the LB, the second I/O port 98-2 is coupled to the I/O port 102 of the primary multiplexer 82 via a MB bandpass filter 106, and the third I/O port 98-3 is coupled to the I/O port 102 of the primary multiplexer 82 via a HB bandpass filter 108. The I/O port 102 of the primary multiplexer 82 is coupled to the primary antenna 84 via, in this example, the primary tuner 86.

In a similar manner, the radio system 74 includes a secondary (or second) radio front-end subsystem 110, the single-die antenna swapping switching circuitry 76-2, a secondary antenna multiplexer 112 (referred to herein as a secondary multiplexer 112), and a secondary antenna 114, which is coupled to the secondary multiplexer 112 via a secondary tuner 116 in this example. In this example, the secondary radio front-end subsystem 110 includes a LB DRX 118 and a MBHB DRX 120. The LB DRX 118 is coupled to a first I/O port 122-1 of the secondary radio front-end subsystem 110 to thereby receive signals in the LB (e.g., signals in the range of 450 MHz to 960 MHz) via the first I/O port 122-1. The MBHB DRX 120 is coupled to a second I/O port 122-2 and a third I/O port 122-3 of the secondary radio front-end subsystem 110. The MBHB DRX 120 receives signals in a MB (e.g., signals in the range of 1710 MHz to 2200 MHz) via the second I/O port 122-2 and receives signals in a HB (e.g., signals in the range of 2300 MHz to 2700 MHz) via the third I/O port 122-3.

The single-die antenna swapping switching circuitry 76-2 includes a first set of I/O ports 124-1 through 124-3 that are coupled to the I/O ports 122-1 through 122-3 of the secondary radio front-end subsystem 110, respectively. The single-die antenna swapping switching circuitry 76-2 also includes a second set of I/O ports 126-1 through 126-3 that are coupled to I/O ports 128-1 through 128-3 of the secondary multiplexer 112, respectively. The antenna swapping port As of the single-die antenna swapping switching circuitry 76-2 is coupled to the antenna swapping port Bp of the single-die antenna swapping switching circuitry 76-1 via the coaxial cable 78-2 or transmission line. The antenna swapping port Bs of the single-die antenna swapping switching circuitry 76-2 is coupled to the antenna swapping port Ap of the single-die antenna swapping switching circuitry 76-1 via the coaxial cable 78-1 or transmission line. The single-die antenna swapping switching circuitry 76-2 includes, in this example, a number of pseudo-DP2T switching elements 130-1 through 130-3 that operate to selectively couple the first set of I/O ports 124-1 through 124-3 to either the second set of I/O ports 126-1 through 126-3 or one of the antenna swapping ports As and Bs. For example, if antenna swapping is desired for LB transmission, the pseudo-DP2T switching element 130-1 is controlled (e.g., via an internal or external controller) such that the antenna swapping port Bs is coupled to the I/O port 126-1 but not the I/O port 124-1. Conversely, if antenna swapping is not desired for LB transmission, the pseudo-DP2T switching element 130-1 is controlled (e.g., via an internal or external controller) such that the antenna swapping port Bs is not coupled to the I/O port 126-1.

The secondary multiplexer 112 includes the I/O ports 128-1 through 128-3 that are coupled to the second set of I/O ports 126-1 through 126-3 of the single-die antenna swapping switching circuitry 76-2, respectively. The first I/O port 128-1 is coupled to an I/O port 132 of the secondary multiplexer 112 via a low-pass filter 134 corresponding to the LB, the second I/O port 128-2 is coupled to the I/O port 132 of the secondary multiplexer 112 via a MB bandpass filter 136, and the third I/O port 128-3 is coupled to the I/O port 132 of the secondary multiplexer 112 via a HB bandpass filter 138. The I/O port 132 of the secondary multiplexer 112 is coupled to the secondary antenna 114 via, in this example, the secondary tuner 116.

Figure 6:
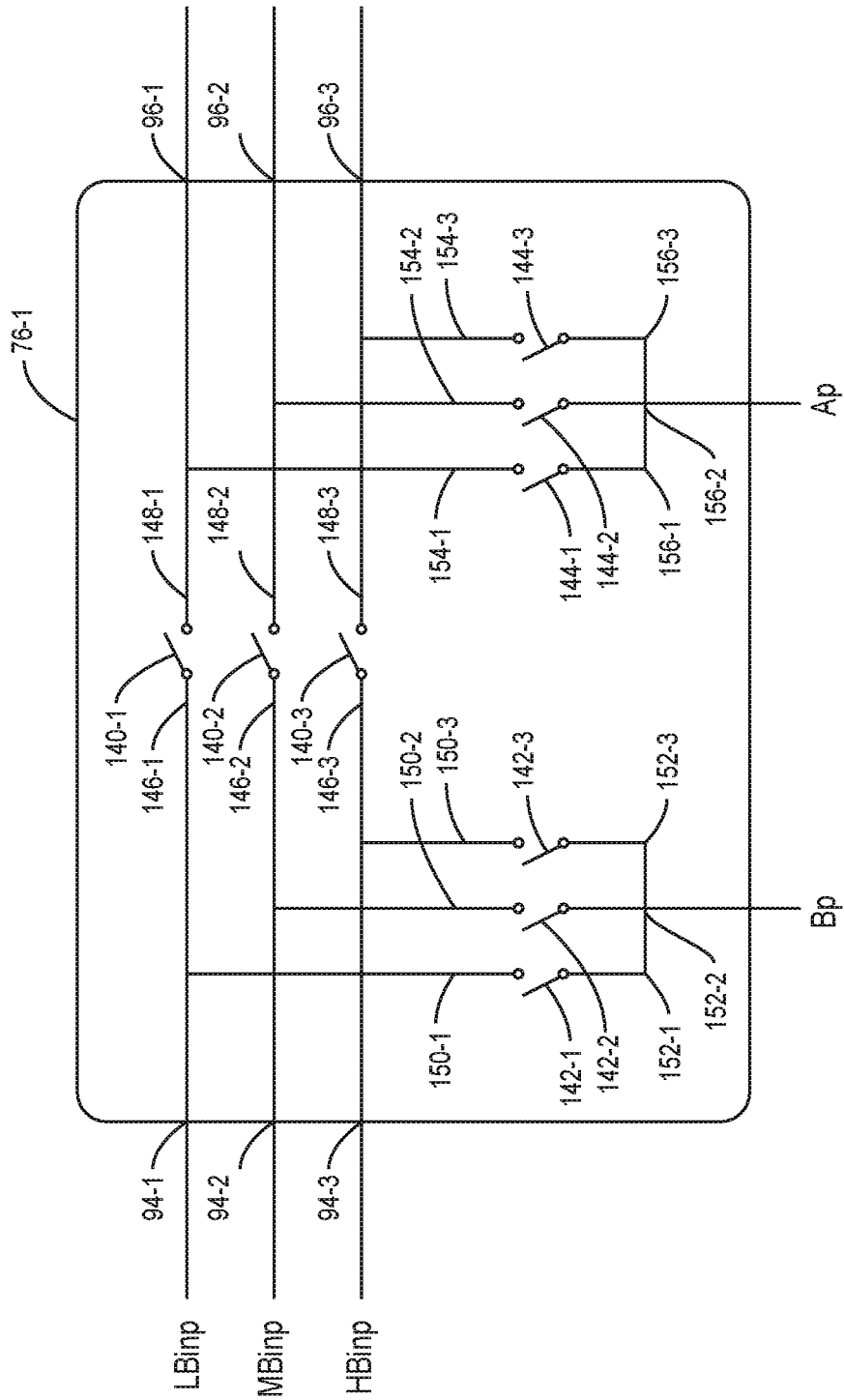
FIG. 6 illustrates the single-die antenna swapping circuitry of FIG. 5 in more detail according to some embodiments of the present disclosure.
Figure 9:
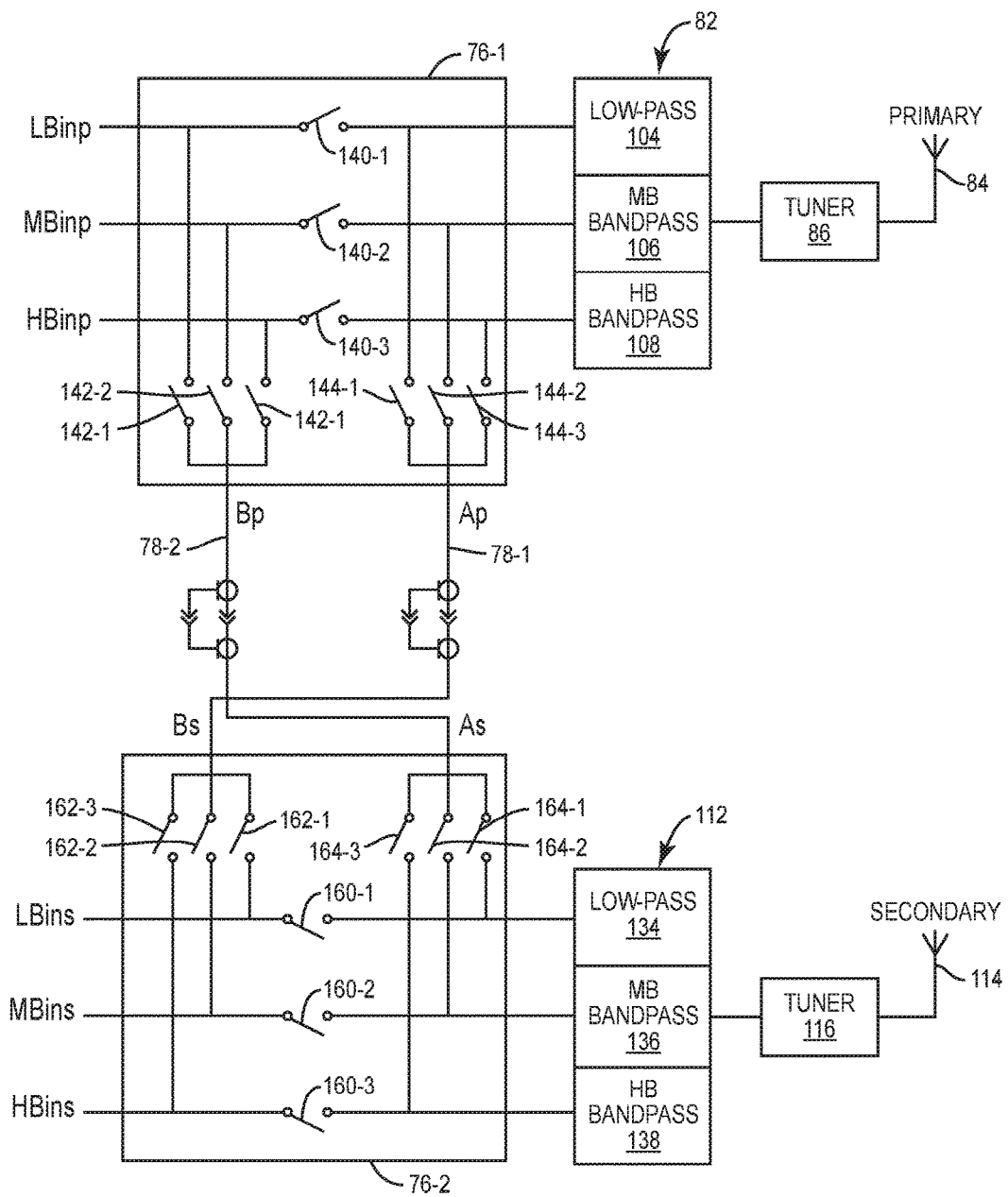
FIG. 9 illustrates both the antenna swapping switching circuitry of the primary path and the antenna swapping switching circuitry of the secondary path of the radio system of FIG. 5 according to some embodiments of the present disclosure.

FIG. 6 illustrates the single-die antenna swapping switching circuitry 76-1 of FIG. 5 in more detail according to some embodiments of the present disclosure. In particular, in this example, the pseudo-DP2T switching elements 100-1 through 100-3 are implemented by three sets of switches 140-1 through 140-3, 142-1 through 142-3, and 144-1 through 144-3. The first set of switches 140-1 through 140-3 have first terminals 146-1 through 146-3 coupled to the first set of I/O ports 94-1 through 94-3, respectively, and second terminals 148-1 through 148-3 coupled to the second set of I/O ports 96-1 through 96-3, respectively. The second set of switches 142-1 through 142-3 have first terminals 150-1 through 150-3 coupled to the first set of I/O ports 94-1 through 94-3, respectively, and second terminals 152-1 through 152-3 each coupled to the antenna swapping port Bp. The third set of switches 144-1 through 144-3 have first terminals 154-1 through 154-3 coupled to the second set of I/O ports 96-1 through 96-3, respectively, and second terminals 156-1 through 156-3 each coupled to the antenna swapping port Ap. As illustrated in FIG. 9 and described below, the single-die antenna swapping switching circuitry 76-2 has a similar architecture.

Figure 7:
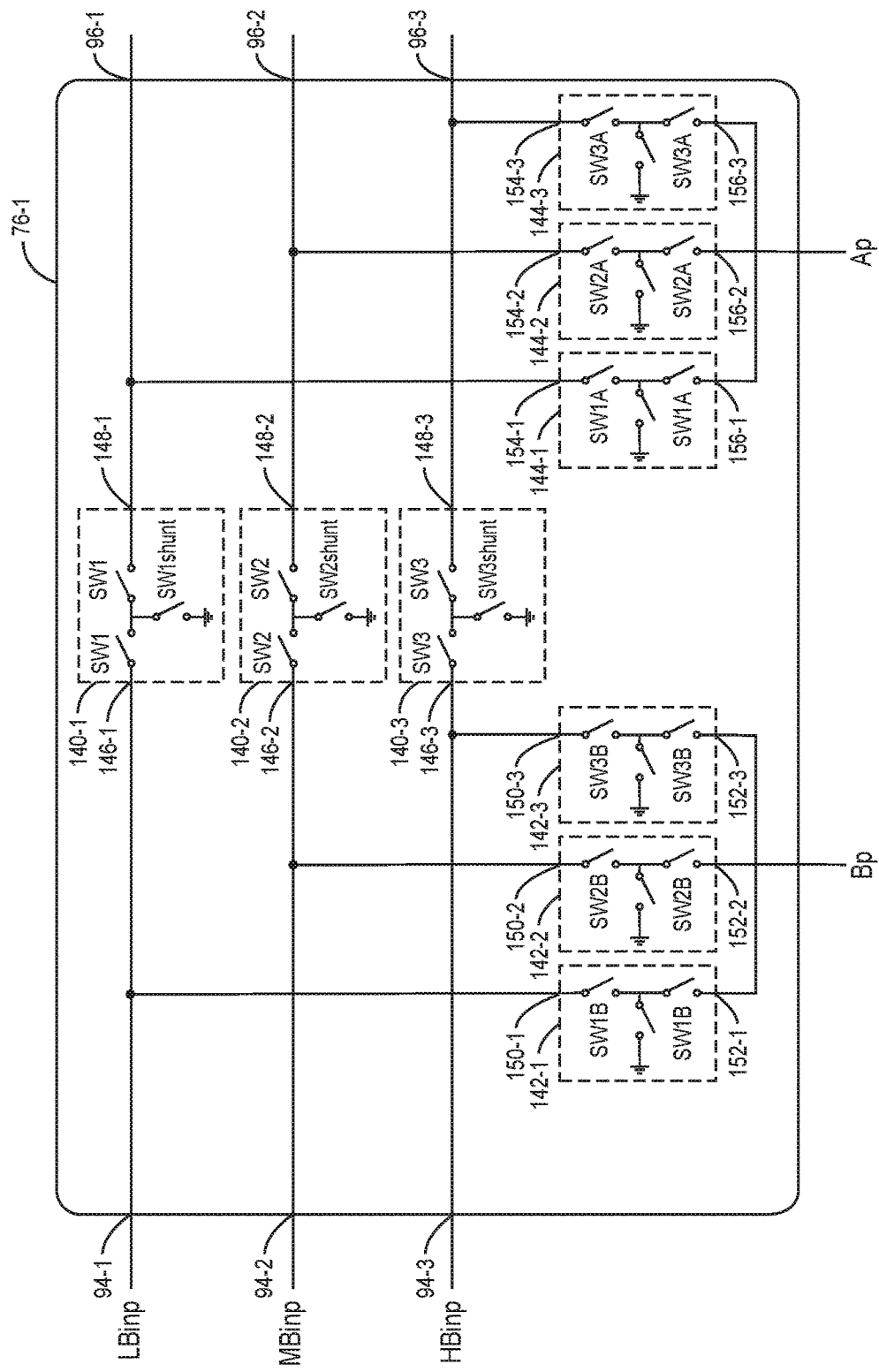
FIG. 7 illustrates the use of a shunt-series-shunt switch in the single-die antenna swapping circuitry of FIG. 6.

In the preferred embodiments described herein, each of the switches 140-1 through 140-3, 142-1 through 142-3, and 144-1 through 144-3 shown in FIG. 6 is a series-shunt-series switch for improved isolation when the switch is in OFF mode (i.e., open), where the shunt switch is closed, as shown in FIG. 7. However, for simplicity, a simple switch is shown instead of the three switches (series-shunt-switch) in the figures. In the same manner, the switches of the single-die antenna swapping switching circuitry 76-2 are also preferably series-shunt-series switches. With regard to a series-shunt-series switch, the series-shunt-series switch is in the OFF mode (i.e., open) when the two series switches are open and the shunt switch is closed. Conversely, the series-shunt-series switch is in the ON mode (i.e., closed) when the two series switches are closed and the shunt switch is open.

Figure 8:
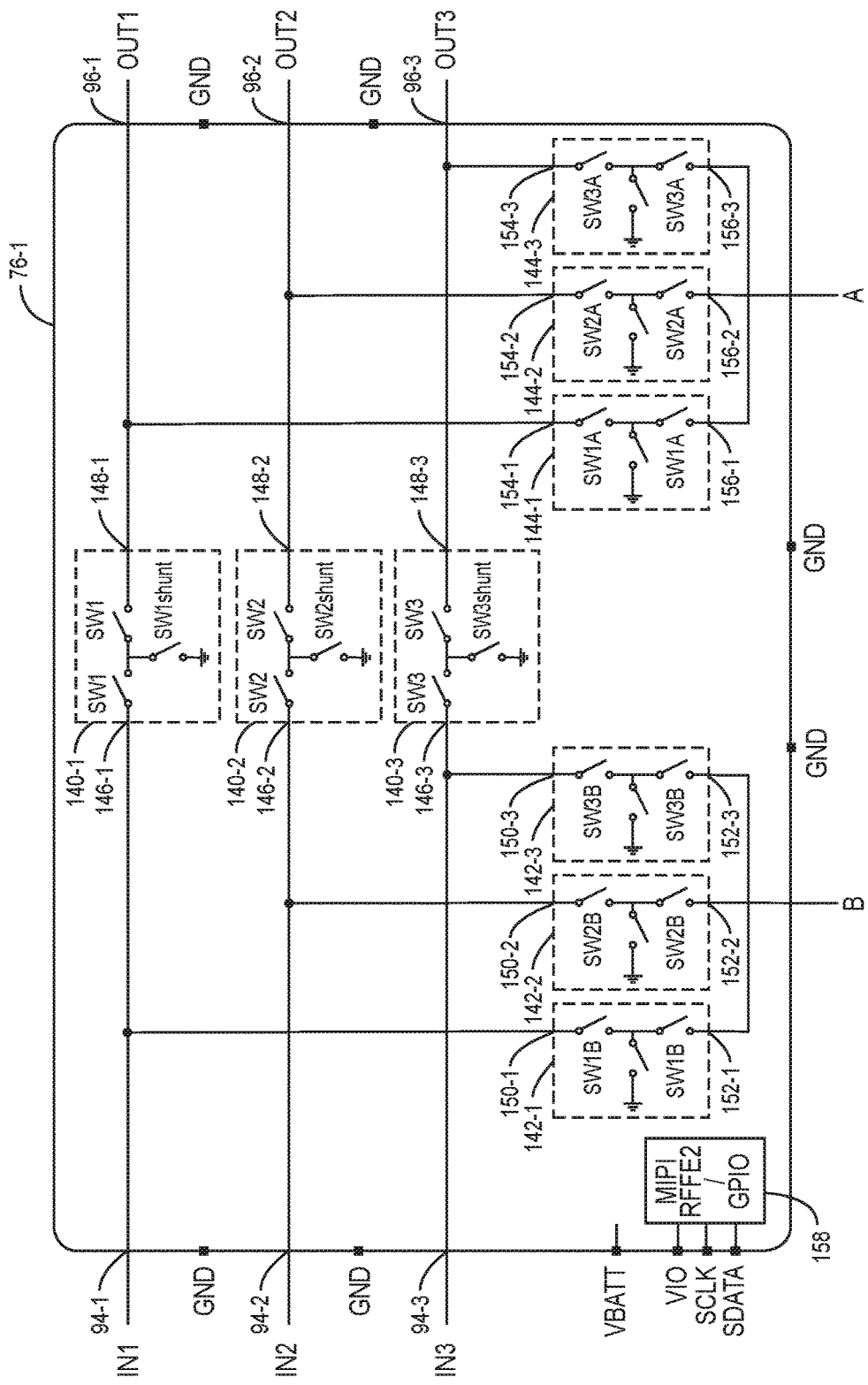
FIG. 8 illustrates the single-die antenna swapping switching circuitry of FIG. 6 in more detail according to one particular embodiment in which each of the switches in the single-die antenna swapping switching circuitry is a series-shunt-series switch.

FIG. 8 illustrates the single-die antenna swapping switching circuitry 76-1 in more detail according to one particular embodiment in which each of the switches 140-1 through 140-3, 142-1 through 142-3, and 144-1 through 144-3 is a series-shunt-series switch as described above. This example also illustrates a Mobile Industry Processor Interface (MIPI) Radio Frequency Front End (RFFE) RFFE2/General Purpose I/O (GPIO) interface 158, which may operate to receive control signals for controlling the switches 140-1 through 140-3, 142-1 through 142-3, and 144-1 through 144-3 from an external controller. Note that, while in this example each of the switches 140-1 through 140-3, 142-1 through 142-3, and 144-1 through 144-3 is a series-shunt-series switch, the present disclosure is not limited thereto. For example, some of the switches 140-1 through 140-3, 142-1 through 142-3, and 144-1 through 144-3 may be series-shunt-series switches whereas some other of the switches 140-1 through 140-3, 142-1 through 142-3, and 144-1 through 144-3 may be cascaded switches. In one specific example, the switches 142-1 and 144-1 are series-shunt-series switches as shown in FIG. 6, but the switches 142-2 and 142-3 are cascaded and the switches 144-2 and 144-3 are cascaded. Other switch configurations are also possible, as will be appreciated by one of ordinary skill in the art.

FIGS. 6 through 8 illustrate the details of the single-die antenna swapping switching circuitry 76-1. However, those details are also applicable to the single-die antenna swapping switching circuitry 76-2. In this regard, FIG. 9 illustrates both the single-die antenna swapping switching circuitry 76-1 and the single-die antenna swapping switching circuitry 76-2 according to some embodiments of the present disclosure. As illustrated and discussed above, the pseudo-DP2T switching elements 100-1 through 100-3 of the single-die antenna swapping switching circuitry 76-1 are implemented by three sets of switches 140-1 through 140-3, 142-1 through 142-3, and 144-1 through 144-3.

In the same manner, the pseudo-DP2T switching elements 130-1 through 130-3 of the single-die antenna swapping switching circuitry 76-2 are implemented by three sets of switches 160-1 through 160-3, 162-1 through 162-3, and 164-1 through 164-3. The first set of switches 160-1 through 160-3 have first terminals coupled to the first set of I/O ports 124-1 through 124-3 of the single-die antenna swapping switching circuitry 76-2, respectively, and second terminals coupled to the second set of I/O ports 126-1 through 126-3 of the single-die antenna swapping switching circuitry 76-2, respectively. The second set of switches 162-1 through 162-3 have first terminals coupled to the first set of I/O ports 124-1 through 124-3 of the single-die antenna swapping switching circuitry 76-2, respectively, and second terminals each coupled to the antenna swapping port Bs. The third set of switches 164-1 through 164-3 have first terminals coupled to the second set of I/O ports 126-1 through 126-3 of the single-die antenna swapping switching circuitry 76-2, respectively, and second terminals each coupled to the antenna swapping port As. The antenna swapping port Ap of the single-die antenna swapping switching circuitry 76-1 is coupled to the antenna swapping port Bs of the single-die antenna swapping switching circuitry 76-2 via the coaxial cable 78-1 or a transmission line, and the antenna swapping port Bp of the single-die antenna swapping switching circuitry 76-1 is coupled to the antenna swapping port As of the single-die antenna swapping switching circuitry 76-2 via the coaxial cable 78-2 or a transmission line.

Figure 10:
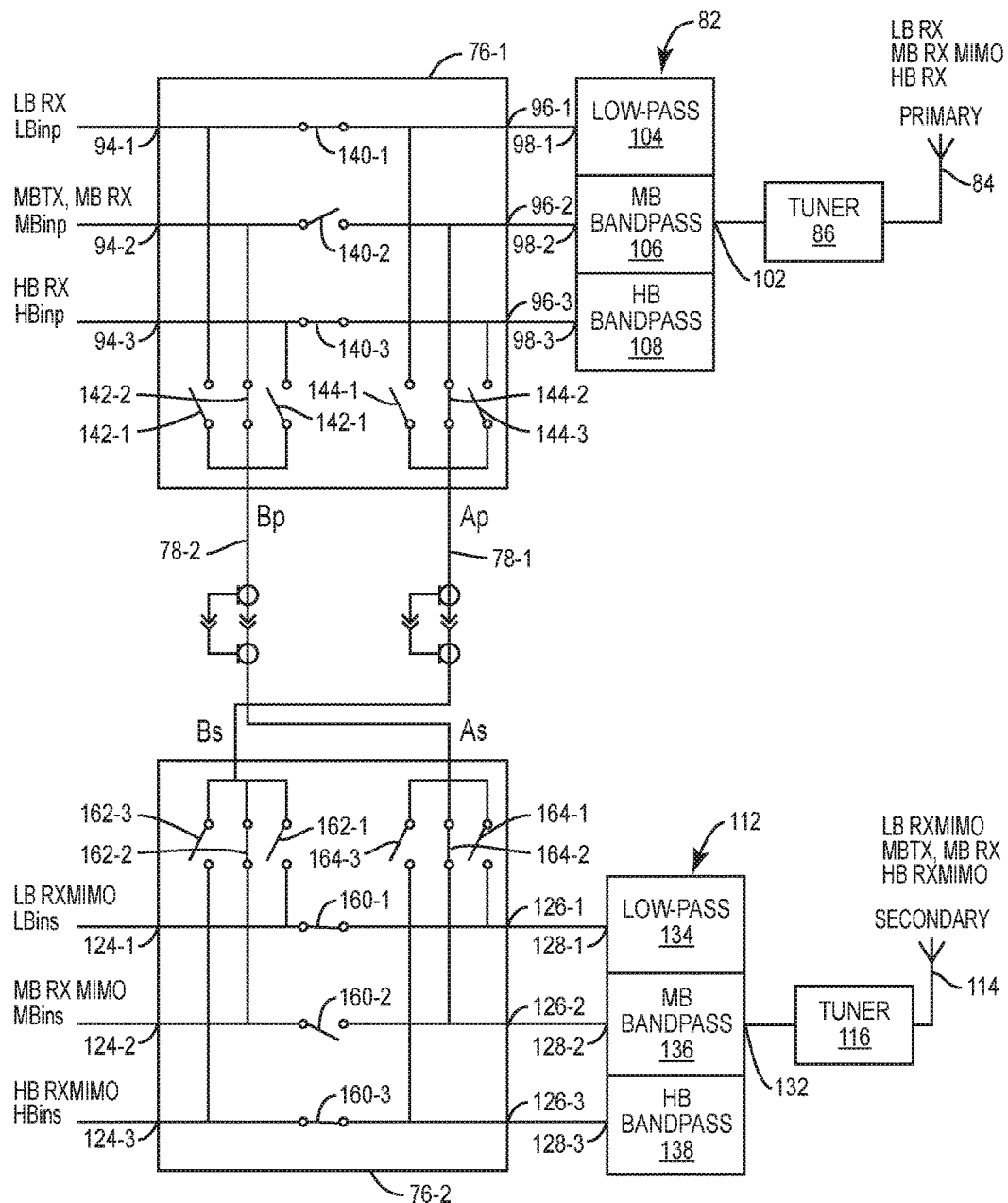
FIGS. 10 through 12 illustrate some examples of the operation of the antenna swapping switching circuitry according to some embodiments of the present disclosure.
Figure 11:
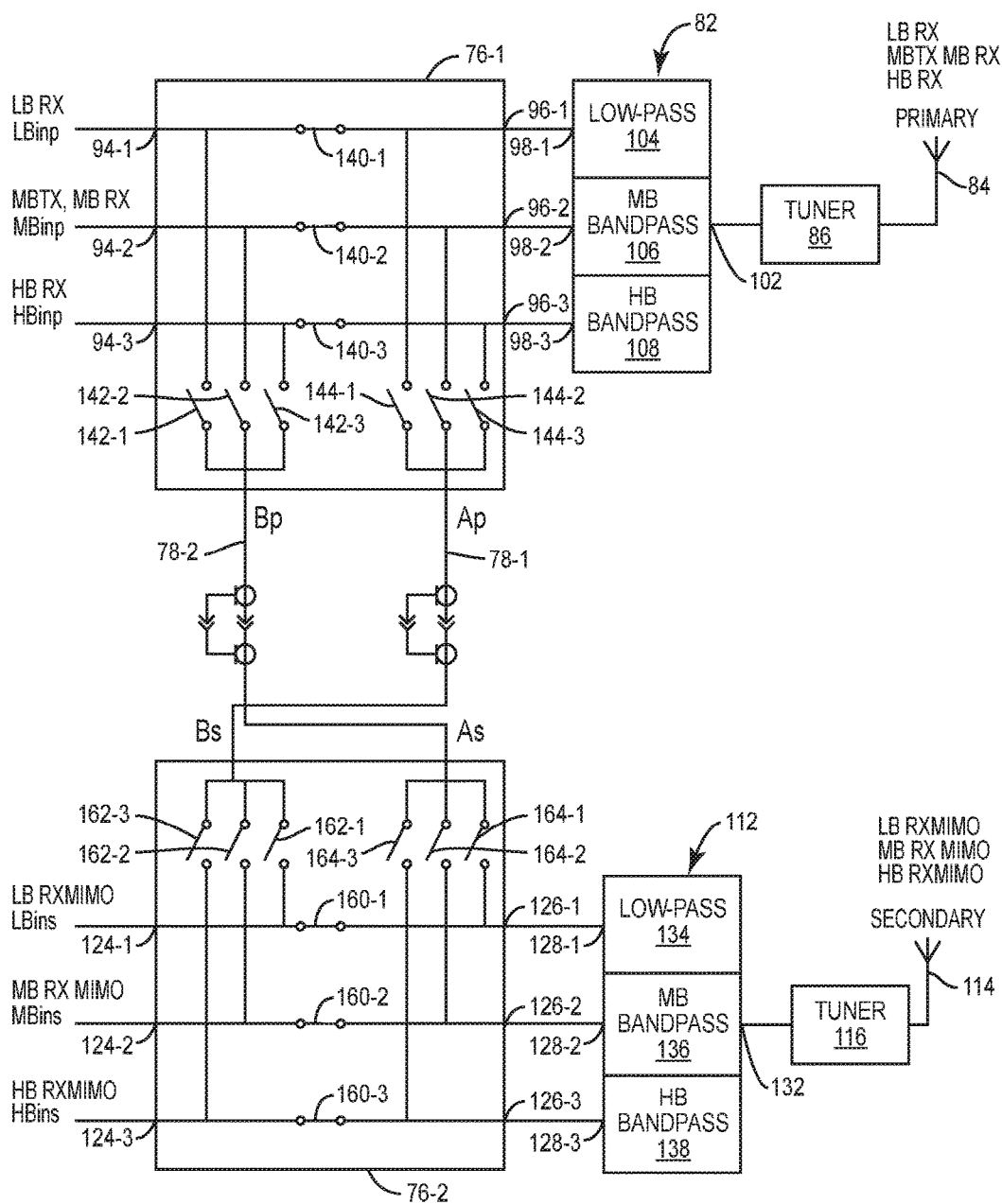
Figure 12:
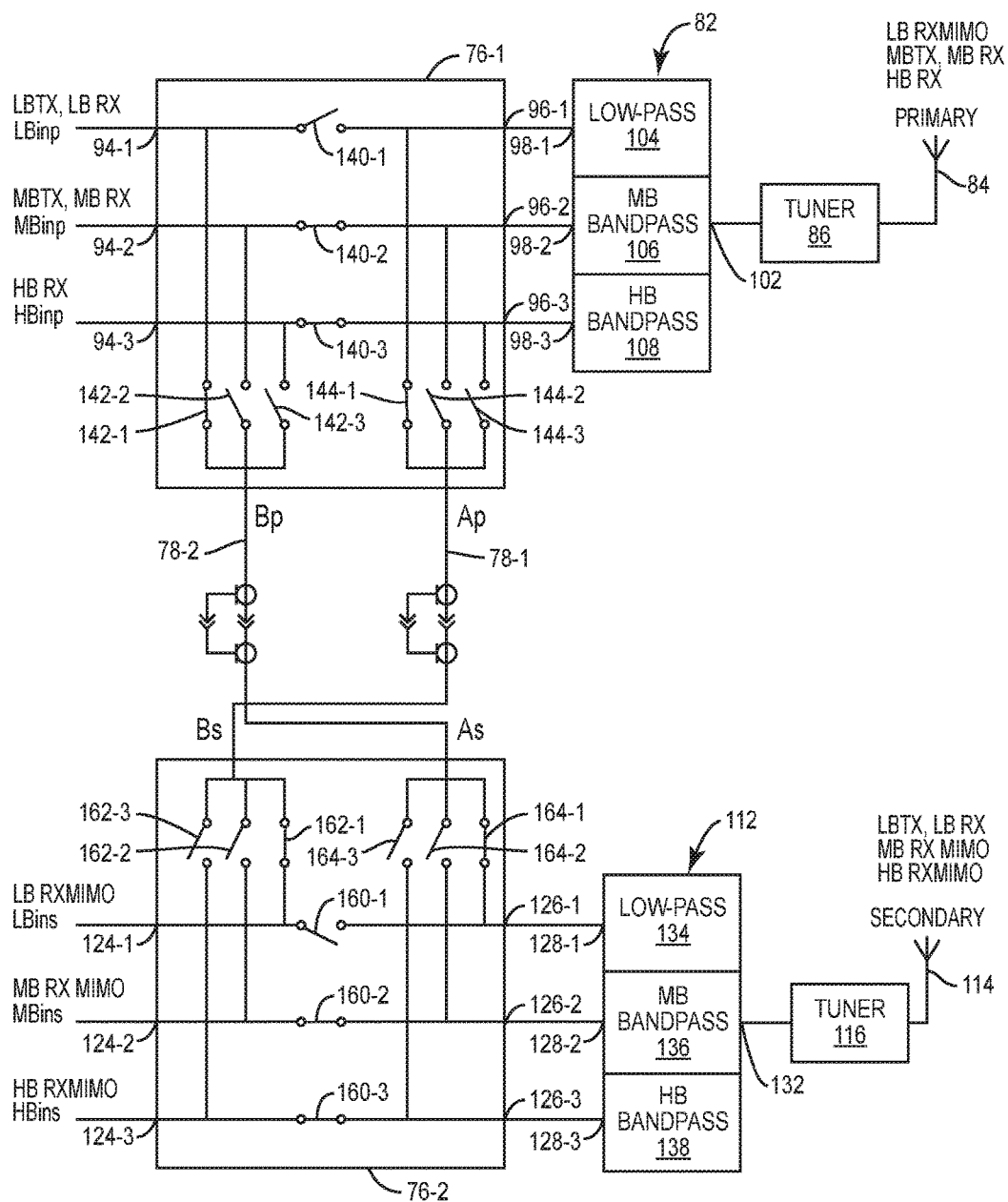

FIGS. 10 through 12 illustrate some examples of the operation of the single-die antenna swapping switching circuitry 76-1 and 76-2 according to some embodiments of the present disclosure. In particular, FIG. 10 illustrates an example in which MB transmission is occurring on the secondary antenna 114, while the LB and HB are received on both the primary and secondary antennas 84 and 114 (e.g., RX MIMO). More specifically, for MB transmission, the switch 140-2 is open such that the I/O port 94-2 is not coupled to the I/O port 96-2 or the primary antenna 84. In addition, the switch 142-2 is closed such that the I/O port 94-2 is coupled to the antenna swapping port Bp, which is coupled to the antenna swapping port As of the single-die antenna swapping switching circuitry 76-2. At the single-die antenna swapping switching circuitry 76-2, the switch 164-2 is closed and the switch 160-2 is open such that the antenna swapping port As is coupled to the I/O port 126-2 and thus the secondary antenna 114 but is not coupled to the I/O port 124-2 (and thus not to the MBHB DRX 120). Thus, when a MB transmit signal is provided to the I/O port 94-2 of the single-die antenna swapping switching circuitry 76-1, the MB transmit signal passes through the closed switch 142-2 and the antenna swapping port Bp to the antenna swapping port As of the single-die antenna swapping switching circuitry 76-2. From the antenna swapping port As, the MB transmit signal passes through the closed switch 164-2 to the I/O port 128-2 of the single-die antenna swapping switching circuitry 76-2 and then on to the secondary antenna 114 via the secondary multiplexer 112.

As for the LB, at the single-die antenna swapping switching circuitry 76-1, the switch 140-1 is closed and the switches 142-1 and 144-1 are open such that the I/O port 94-1 for the LB is coupled to the I/O port 96-1 and thus to the primary antenna 84 via the primary multiplexer 82. Likewise, at the single-die antenna swapping switching circuitry 76-2, the switch 160-1 is closed and the switches 162-1 and 164-1 are open such that the I/O port 124-1 for the LB is coupled to the I/O port 126-1 and thus to the secondary antenna 114 via the secondary multiplexer 112.

For the HB, at the single-die antenna swapping switching circuitry 76-1, the switch 140-3 is closed and the switches 142-3 and 144-3 are open such that the I/O port 94-3 for the HB is coupled to the I/O port 96-3 and thus to the primary antenna 84 via the primary multiplexer 82. Likewise, at the single-die antenna swapping switching circuitry 76-2, the switch 160-3 is closed and the switches 162-3 and 164-3 are open such that the I/O port 124-3 for the LB is coupled to the I/O port 126-3 and thus to the secondary antenna 114 via the secondary multiplexer 112.

FIG. 11 illustrates another example switching configuration in which the MB is transmitting on the primary antenna 84. As illustrated, for MB transmission, the switch 140-2 is closed and the switches 142-2 and 144-2 are open such that the I/O port 94-2 is coupled to the I/O port 96-2 and thus to the primary antenna 84, but the I/O port 94-2 is not coupled to either of the antenna swapping ports Ap and Bp. At the single-die antenna swapping switching circuitry 76-2, the switch 160-2 is closed and the switches 162-2 and 164-2 are open such that the I/O port 124-2 for the MB is coupled to the I/O port 126-2 and thus to the secondary antenna 114 via the secondary multiplexer 112, but the I/O port 124-2 is not coupled to either of the antenna switching ports Bs and As.

As for the LB, at the single-die antenna swapping switching circuitry 76-1, the switch 140-1 is closed and the switches 142-1 and 144-1 are open such that the I/O port 94-1 for the LB is coupled to the I/O port 96-1 and thus to the primary antenna 84 via the primary multiplexer 82. Likewise, at the single-die antenna swapping switching circuitry 76-2, the switch 160-1 is closed and the switches 162-1 and 164-1 are open such that the I/O port 124-1 for the LB is coupled to the I/O port 126-1 and thus to the secondary antenna 114 via the secondary multiplexer 112.

For the HB, at the single-die antenna swapping switching circuitry 76-1, the switch 140-3 is closed and the switches 142-3 and 144-3 are open such that the I/O port 94-3 for the HB is coupled to the I/O port 96-3 and thus to the primary antenna 84 via the primary multiplexer 82. Likewise, at the single-die antenna swapping switching circuitry 76-2, the switch 160-3 is closed and the switches 162-3 and 164-3 are open such that the I/O port 124-3 for the LB is coupled to the I/O port 126-3 and thus to the secondary antenna 114 via the secondary multiplexer 112.

FIG. 12 illustrates another example switching configuration in which the LB is transmitting on the secondary antenna 114 and the MB is transmitting on the primary antenna 84, using the swapping approach. As illustrated, for LB transmission, the switch 140-1 is open such that the I/O port 94-1 is not coupled to the I/O port 96-1 or the primary antenna 84. In addition, the switch 142-1 is closed such that the I/O port 94-1 is coupled to the antenna swapping port Bp, which is coupled to the antenna swapping port As of the single-die antenna swapping switching circuitry 76-2. At the single-die antenna swapping switching circuitry 76-2, the switch 164-1 is closed and the switch 160-1 is open such that the antenna swapping port As is coupled to the I/O port 126-1 and thus the secondary antenna 114 but is not coupled to the I/O port 124-1 (and thus not to the LB DRX 118). Thus, when a LB transmit signal is provided to the I/O port 94-1 of the single-die antenna swapping switching circuitry 76-1, the LB transmit signal passes through the closed switch 142-1 and the antenna swapping port Bp to the antenna swapping port As of the single-die antenna swapping switching circuitry 76-2. From the antenna swapping port As, the transmit signal passes through the closed switch 164-1 to the I/O port 126-1 of the single-die antenna swapping switching circuitry 76-2 and then on to the secondary antenna 114 via the secondary multiplexer 112.

As for the MB, at the single-die antenna swapping switching circuitry 76-1, the switch 140-2 is closed and the switches 142-2 and 144-2 are open such that the I/O port 94-2 for the MB is coupled to the I/O port 96-2 and thus to the primary antenna 84 via the primary multiplexer 82. Likewise, at the single-die antenna swapping switching circuitry 76-2, the switch 160-2 is closed and the switches 162-2 and 164-2 are open such that the I/O port 124-2 for the MB is coupled to the I/O port 126-2 and thus to the secondary antenna 114 via the secondary multiplexer 112.

For the HB, at the single-die antenna swapping switching circuitry 76-1, the switch 140-3 is closed and the switches 142-3 and 144-3 are open such that the I/O port 94-3 for the HB is coupled to the I/O port 96-3 and thus to the primary antenna 84 via the primary multiplexer 82. Likewise, at the single-die antenna swapping switching circuitry 76-2, the switch 160-3 is closed and the switches 162-3 and 164-3 are open such that the I/O port 124-3 for the LB is coupled to the I/O port 126-3 and thus to the secondary antenna 114 via the secondary multiplexer 112.

Figure 13:
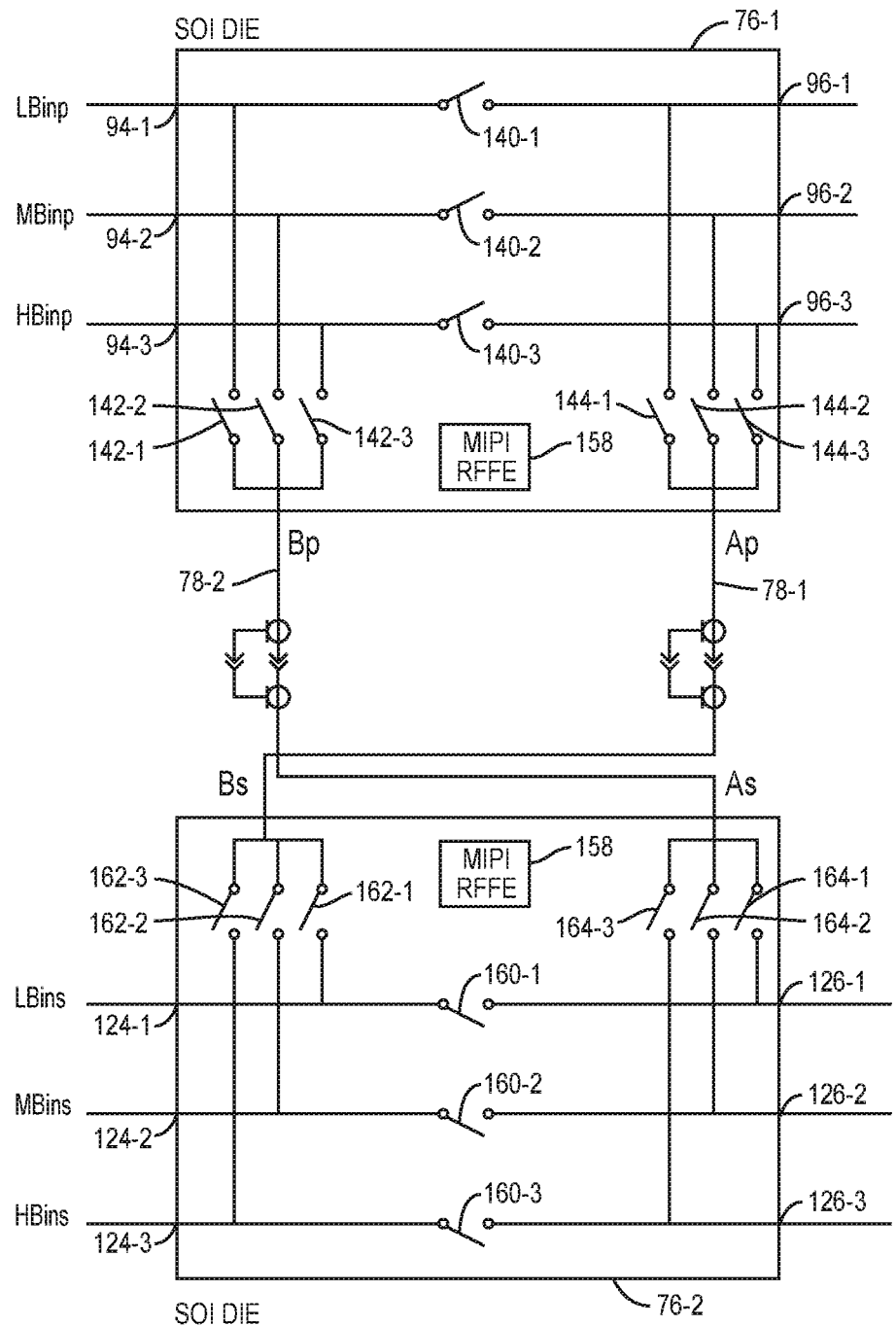
FIG. 13 illustrates the antenna swapping switching circuitry of FIG. 5 according to some embodiments of the present disclosure.

FIG. 13 illustrates the single-die antenna swapping switching circuitry 76-1 and 76-2 according to some embodiments of the present disclosure. The details of FIG. 13 are substantially the same as those of FIG. 9 and, as such, will not be repeated. However, FIG. 13 emphasizes that, in some embodiments, the single-die antenna swapping switching circuitry 76-1 is implemented on a single die and, in this particular example, a single SOI die. Likewise, the single-die antenna swapping switching circuitry 76-2 is implemented on a single die and, in this particular example, a single SOI die. Further, each die includes a MIPI RFFE interface 158 through which control signals that control the configuration of the switches are received. As is apparent, the disclosed switching arrangement implemented in a single die enables dual transmission and also allows performance of all the necessary antenna swapping functions while using only two coaxial cables, with reduced linearity requirements on the switches since they are located before the multiplexer 82, 112. This permits area savings by eliminating the need for multiple coaxial cables.

In the example embodiments described above, the single-die antenna swapping switching circuitry 76-1 (and likewise the single-die antenna swapping switching circuitry 76-2) is a 3×3 switching circuit, and the primary multiplexer 82 is a triplexer. In other words, for the triplexer scenario used for the examples above, the first set of I/O ports 94 of the single-die antenna swapping switching circuitry 76-1 includes three I/O ports 94-1 through 94-3, and the second set of I/O ports 96 of the single-die antenna swapping switching circuitry 76-1 includes three I/O ports 96-1 through 96-3. However, the single-die antenna swapping switching circuitry 76-1 (and likewise the single-die antenna swapping switching circuitry 76-2) can be generalized to an N×M switching circuit in which the first set of I/O ports 94 of the single-die antenna swapping switching circuitry 76-1 includes N I/O ports 94-1 through 94-N and the second set of I/O ports 96 of the single-die antenna swapping switching circuitry 76-1 includes M I/O ports 96-1 through 96-M, where both N and M are greater than 2 and N and M may or may not be equal.

Figure 14:
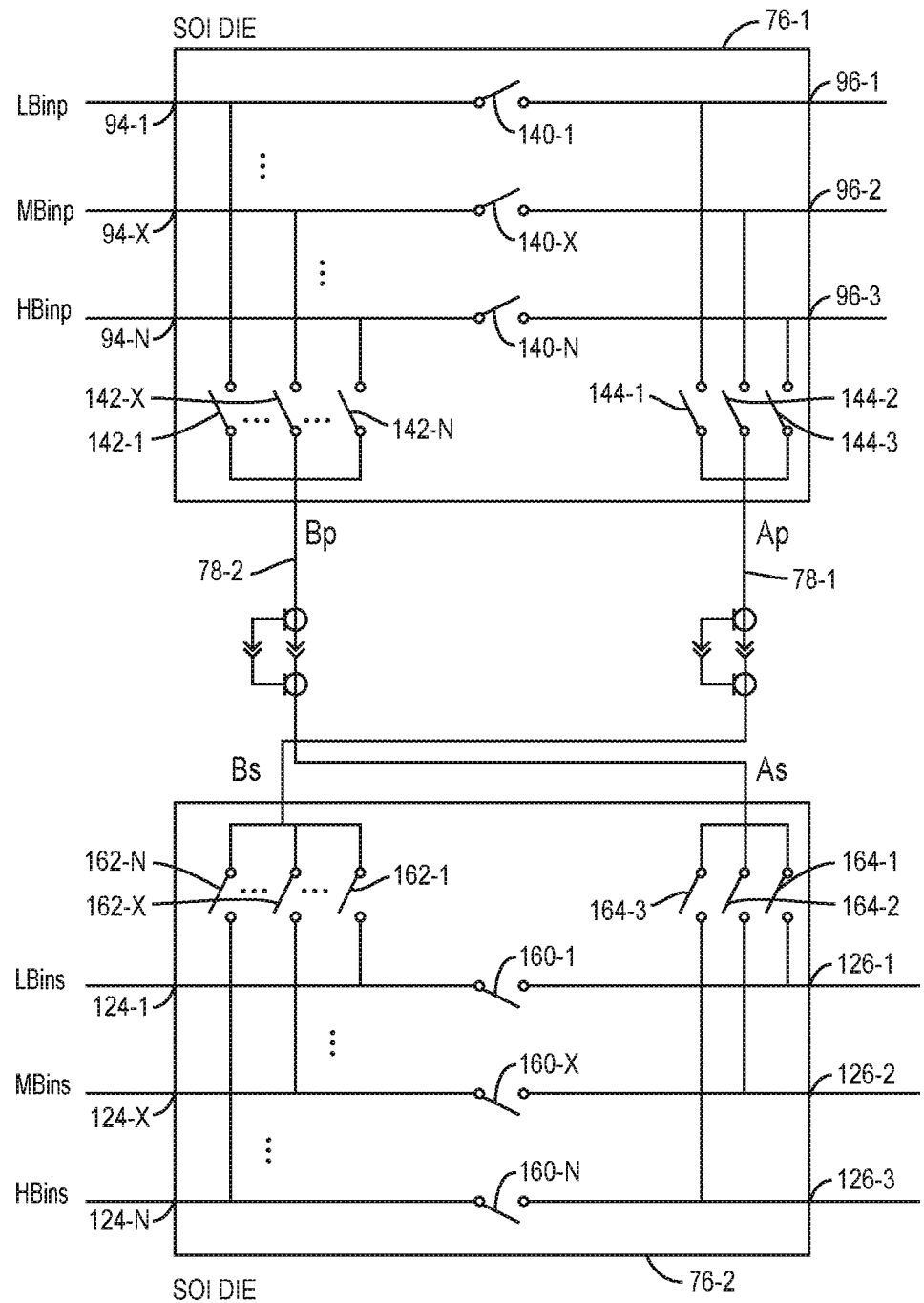
FIG. 14 illustrates an embodiment of the antenna swapping switching circuitry of FIG. 5 in which a first set of Input/Output (I/O) ports of the antenna swapping switching circuitry includes a number (N) of I/O ports and a second set of I/O ports of the antenna swapping switching circuitry includes M I/O ports, where in this example M=3.

For example, FIG. 14 illustrates an embodiment of the single-die antenna swapping switching circuitry 76-1 in which the first set of I/O ports 94 of the single-die antenna swapping switching circuitry 76-1 includes N I/O ports 94-1 through 94-N and the second set of I/O ports 96 of the single-die antenna swapping switching circuitry 76-1 includes three I/O ports 96-1 through 96-3 (i.e., M=3). In this example, N≥M. Note that, when N>M, the second terminals of at least two of the switches 140-1 through 140-N is coupled to the same I/O port 96. Thus, for instance, since each of the I/O ports 96-1 through 96-3 correspond to a different frequency band of the primary multiplexer 82, then the first set of I/O ports 94-1 through 94-N may include two or more I/O ports 94 for the same frequency band, where these two or more I/O ports 94 are then coupled to the same I/O port 96 via respective switches. Likewise, in this example, the first set of I/O ports 124 of the single-die antenna swapping switching circuitry 76-2 includes N I/O ports 124-1 through 124-N and the second set of I/O ports 126 of the single-die antenna swapping switching circuitry 76-2 includes three I/O ports 126-1 through 126-3 (i.e., M=3). Importantly, regardless of the order of the multiplexers 82 and 112 (which correspond to M in the generalized examples) and the number of I/O ports 94, 96, 124, 126 of the single-die antenna swapping circuitry 76-1 and 76-2, there are only two coaxial cables 78-1 and 78-2.

FIG. 15 illustrates another example of the single-die antenna swapping switching circuitry 76-1 and the single-die antenna swapping switching circuitry 76-2 in which the single-die antenna swapping switching circuitry 76-1 is a 5×2 switching circuit and the single-die antenna swapping switching circuitry 76-2 is a 2×2 switching circuit. In this example, the multiplexers 82 and 112 are diplexers that include low-pass filters 104 and 134 for the LB and bandpass filters 106' and 136' for the MBHB. As illustrated with respect to the single-die antenna swapping switching circuitry 76-1, the switches 140-2 through 140-5 have first terminals that are coupled to the I/O ports 94-2 through 94-5, respectively, and second terminals that are coupled to the same I/O port 96-2.

FIG. 16 illustrates one example of a system 166 (e.g., a wireless device such as, e.g., a mobile phone) that includes the radio system 74 according to some embodiments of the present disclosure. As illustrated, in addition to the radio system 74 described above, the system 166 includes a control system 168 that includes one or more processors 170 (e.g., one or more Central Processing Units (CPUs), one or more Application Specific Integrated Circuits (ASICs), one or more Field Programmable Gate Arrays (FPGAs), and/or the like) and memory 172. The control system 168 operates to, in this example, send and receive transmit and receive signals to the radio system 74. In addition, the control system 168 provides control signals to the single-die antenna swapping switching circuitry 76-1 and 76-2 to provide antenna swapping as needed or desired. In some embodiments, the functionality of the control system 168 to, e.g., control the single-die antenna swapping switching circuitry 76-1 and 76-2 is implemented in software that is stored in, e.g., the memory 172 and executed by the processor(s) 170.

Those skilled in the art will recognize improvements and modifications to the preferred embodiments of the present disclosure. All such improvements and modifications are considered within the scope of the concepts disclosed herein and the claims that follow.

What is claimed is:

1. Single-die antenna swapping switching circuitry, comprising:
    a number (N) of first input/output ports, where N is greater than or equal to 2;
    a number (M) of second input/output ports, where M is greater than or equal to 2;
    a first antenna swapping port;
    a second antenna swapping port;
    a number (N) of first switches having first terminals coupled to the first input/output ports, respectively, and second terminals coupled to the second input/output ports;
    a number (N) of second switches having first terminals coupled to the first input/output ports, respectively, and second terminals coupled to the first antenna swapping port; and
    a number (M) of third switches having first terminals coupled to the second input/output ports, respectively, and second terminals coupled to the second antenna swapping port.

2. The single-die antenna swapping switching circuitry of claim 1 wherein N=M and the second terminals of the first switches are coupled to the second input/output ports, respectively.

3. The single-die antenna swapping switching circuitry of claim 1 wherein N>M and the second terminals of at least two of the first switches are coupled to a same one of the second input/output ports.

4. The single-die antenna swapping switching circuitry of claim 1 wherein N≥3 and M≥3.

5. The single-die antenna swapping switching circuitry of claim 1 wherein at least one switch of the first switches, the second switches, and the third switches is a series-shunt-series switch.

6. The single-die antenna swapping switching circuitry of claim 1 wherein:
    the first input/output ports are adapted to be coupled to input/output ports of a multi-band radio front-end system;
    the second input/output ports are adapted to be coupled to a first antenna via a multiplexer;
    the second antenna swapping port is adapted to be coupled, via a first transmission line or first coaxial cable, to a first antenna swapping port of second single-die antenna swapping switching circuitry associated with a second antenna; and
    the first antenna swapping port is adapted to be coupled, via a second transmission line or second coaxial cable, to a second antenna swapping port of the second single-die antenna swapping switching circuitry associated with the second antenna.

7. The single-die antenna swapping switching circuitry of claim 1 wherein the first switches, the second switches, and the third switches are adapted to be controlled to provide a transmit signal received at one of the first input/output ports to the first antenna swapping port but not to any of the second input/output ports when antenna swapping is desired.

8. The single-die antenna swapping switching circuitry of claim 7 wherein the first switches, the second switches, and the third switches are further adapted to be controlled to provide a transmit signal received at one of the first input/output ports to one of the second input/output ports but not the first antenna swapping port when antenna swapping is not desired.

9. A radio system comprising:
   a first radio front-end subsystem comprising a number (N) of input/output ports, where N is greater than or equal to 2;
   first single-die antenna swapping switching circuitry comprising:
      a number (N) of first input/output ports coupled to the input/output ports of the first radio front-end subsystem, respectively;
      a number (M) of second input/output ports, where M is greater than or equal to 2;
      a first antenna swapping port;
      a second antenna swapping port;
      a number (N) of first switches having first terminals coupled to the first input/output ports of the first single-die antenna swapping switching circuitry, respectively, and second terminals coupled to the second input/output ports of the first single-die antenna swapping switching circuitry;
      a number (N) of second switches having first terminals coupled to the first input/output ports of the first single-die antenna swapping switching circuitry, respectively, and second terminals coupled to the first antenna swapping port of the first single-die antenna swapping switching circuitry; and
      a number (M) of third switches having first terminals coupled to the second input/output ports of the first single-die antenna swapping switching circuitry, respectively, and second terminals coupled to the second antenna swapping port of the first single-die antenna swapping switching circuitry;
   a first multiplexer comprising:
      a number (M) of first input/output ports coupled to the second input/output ports of the first single-die antenna swapping switching circuitry, respectively; and
      a second input/output port; and
   a first antenna coupled to the second input/output port of the first multiplexer.

10. The radio system of claim 9 further comprising:
    a second radio front-end subsystem;
    second single-die antenna swapping switching circuitry comprising:
       first input/output ports coupled to input/output ports of the second radio front-end subsystem, respectively;
       second input/output ports;
       a first antenna swapping port coupled to the second antenna swapping port of the first single-die antenna swapping switching circuitry; and
       a second antenna swapping port coupled to the first antenna swapping port of the first single-die antenna swapping switching circuitry;
    a second multiplexer comprising:
       input/output ports coupled to the second input/output ports of the second single-die antenna swapping switching circuitry, respectively; and
       a second input/output port; and
    a second antenna coupled to the second input/output port of the second multiplexer.

11. The radio system of claim 10 wherein the second single-die antenna swapping switching circuitry further comprises:
    a plurality of first switches having first terminals coupled to the first input/output ports of the second single-die antenna swapping switching circuitry, respectively, and second terminals coupled to the second input/output ports of the second single-die antenna swapping switching circuitry;
    a plurality of second switches having first terminals coupled to the first input/output ports of the second single-die antenna swapping switching circuitry, respectively, and second terminals coupled to the first antenna swapping port of the second single-die antenna swapping switching circuitry; and
    a plurality of third switches having first terminals coupled to the second input/output ports of the second single-die antenna swapping switching circuitry, respectively, and second terminals coupled to the second antenna swapping port of the second single-die antenna swapping switching circuitry.

12. The radio system of claim 9 wherein N=M and the second terminals of the first switches of the first single-die antenna swapping switching circuitry are coupled to the second input/output ports of the first single-die antenna swapping switching circuitry, respectively.

13. The radio system of claim 9 wherein N>M and the second terminals of at least two of the first switches of the first single-die antenna swapping switching circuitry are coupled to a same one of the second input/output ports of the first single-die antenna swapping switching circuitry.

14. The radio system of claim 9 wherein N≥3 and M≥3.

15. The radio system of claim 9 wherein at least one switch of the first switches, the second switches, and the third switches of the first single-die antenna swapping switching circuitry is a series-shunt-series switch.

16. The radio system of claim 9 wherein the first switches, the second switches, and the third switches of the first single-die antenna swapping switching circuitry are adapted to be controlled to provide a transmit signal received at one of the first input/output ports of the first single-die antenna swapping switching circuitry to the first antenna swapping port but not to any of the second input/output ports when antenna swapping is desired.

17. The radio system of claim 9 wherein the first switches, the second switches, and the third switches of the first single-die antenna swapping switching circuitry are further adapted to be controlled to provide a transmit signal received at one of the first input/output ports of the first single-die antenna swapping switching circuitry to one of the second input/output ports of the first single-die antenna swapping switching circuitry but not the first antenna swapping port of the first single-die antenna swapping switching circuitry when antenna swapping is not desired.

* * * * *

UNITED STATES PATENT AND TRADEMARK OFFICE
CERTIFICATE OF CORRECTION

PATENT NO. : 9,735,854 B2  
APPLICATION NO. : 15/130380  
DATED : August 15, 2017  
INVENTOR(S) : Nadim Khlat et al.

Page 1 of 1

It is certified that error appears in the above-identified patent and that said Letters Patent is hereby corrected as shown below:

In the Specification

In Column 7, Line 43, replace "CA B12-134, CA B8-1313," with --CA B12-B4, CA B8-B13,--.

Signed and Sealed this  
Tenth Day of October, 2017

Joseph Matal  
*Performing the Functions and Duties of the*  
*Under Secretary of Commerce for Intellectual Property and*  
*Director of the United States Patent and Trademark Office*